US012680938B2

(12) United States Patent
    Osborne

(10) Patent No.: US 12,680,938 B2
(45) Date of Patent: Jul. 14, 2026

(54) METHODS FOR DETERMINING PARTICLE POSITIONAL INFORMATION IN A FLOW CYTOMETER CORE STREAM AND SYSTEMS FOR SAME

(71) Applicant: BECTON, DICKINSON AND COMPANY, Franklin Lakes, NJ (US)

(72) Inventor: Geoffrey Osborne, Bellbowrie (AU)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 552 days.

(21) Appl. No.: 18/226,086

(22) Filed: Jul. 25, 2023

(65) Prior Publication Data

US 2024/0044769 A1     Feb. 8, 2024

Related U.S. Application Data

(60) Provisional application No. 63/394,415, filed on Aug. 2, 2022.

(51) Int. Cl.
    *G01N 15/1404* (2024.01)
    *G01N 21/49* (2006.01)
    (Continued)

(52) U.S. Cl.
    CPC ......... *G01N 15/1404* (2013.01); *G01N 21/49* (2013.01); *G01N 21/64* (2013.01); (Continued)

(58) Field of Classification Search
    None
    See application file for complete search history.

(56) References Cited

U.S. PATENT DOCUMENTS 7,141,431 B2    11/2006 Chandler et al.
7,262,838 B2    8/2007 Fritz
            (Continued)

FOREIGN PATENT DOCUMENTS

EP            2693192 B1    4/2019

OTHER PUBLICATIONS

Bartosik, et al. "Prospects for the use of upconverting nanoparticles as a contrast agent for enumeration of circulating cells in vivo", International Journal of Nanomedicine, 2020, vol. 15, pp. 1709-1719.

*Primary Examiner* — Jennifer Wecker
*Assistant Examiner* — Tracy Ching-Tian Colena
(74) *Attorney, Agent, or Firm* — Bret E. Field; Bozicevic, Field & Francis LLP

(57) ABSTRACT

Aspects of the present disclosure include methods for determining position information for particles in a flow stream of a flow cytometer. Methods according to certain embodiments include propagating a composition having particles through a flow stream that includes a core stream and a sheath flow stream, irradiating the particles of the composition with a light source, detecting light from the irradiated particles, determining light emission from the irradiated particles of the composition and determining the position of the irradiated particles in the core stream of the flow stream based on the detected light emission. In embodiments, particles are stably associated with (e.g., are covalently bonded to) an irradiation power density-sensitive compound that emits light having an intensity that depends on irradiation power density of the light source incident on the particle. Systems (e.g., flow cytometers) for practicing the subject methods are also described. Non-transitory computer readable storage medium is also provided.

19 Claims, 9 Drawing Sheets

(51) Int. Cl.
    *G01N 21/64*     (2006.01)
    *G01N 15/1434*     (2024.01)
    *G01N 21/59*     (2006.01)
    *G01N 21/85*     (2006.01)

(52) U.S. Cl.
    CPC ................ *G01N 2015/1443* (2013.01); *G01N 2021/5957* (2013.01); *G01N 2021/8557* (2013.01)

(56)             References Cited

U.S. PATENT DOCUMENTS

| | | | |
|---|---|---|---|
| 10,036,698 | B2 | 7/2018 | Yamamoto et al. |
| 11,060,894 | B2 | 7/2021 | Norton et al. |
| 2015/0177113 | A1* | 6/2015 | Nitta ...................... G01N 21/53 |
| | | | 356/338 |
| 2022/0381670 | A1 | 12/2022 | Takahashi et al. |
| 2022/0381673 | A1 | 12/2022 | Hegyi et al. |

* cited by examiner

FIG. 2

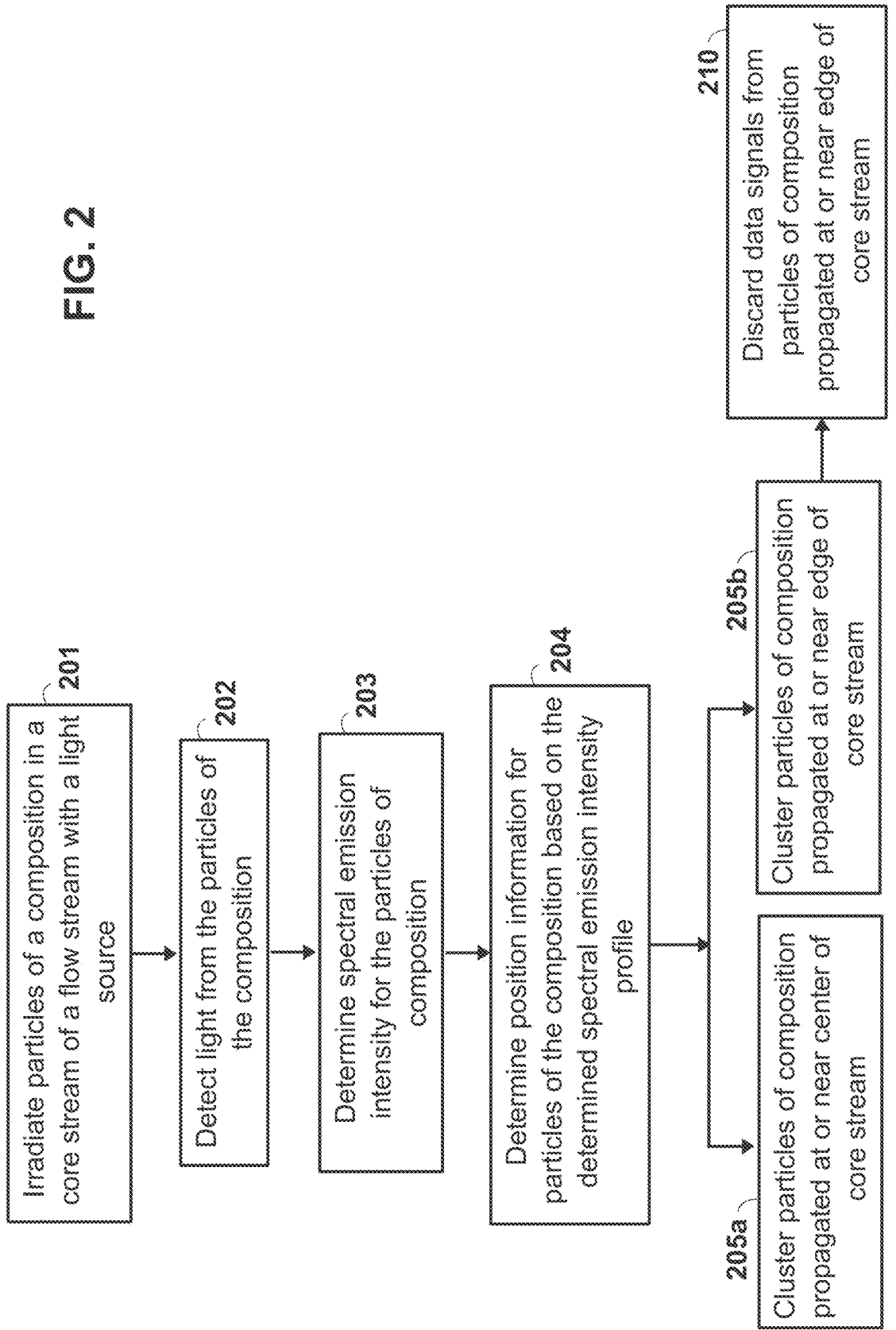

201 Irradiate particles of a composition in a core stream of a flow stream with a light source 202 Detect light from the particles of the composition 203 Determine spectral emission intensity for the particles of composition 204 Determine position information for particles of the composition based on the determined spectral emission intensity profile 205a Cluster particles of composition propagated at or near center of core stream 205b Cluster particles of composition propagated at or near edge of core stream 210 Discard data signals from particles of composition propagated at or near edge of core stream

FIG. 6B
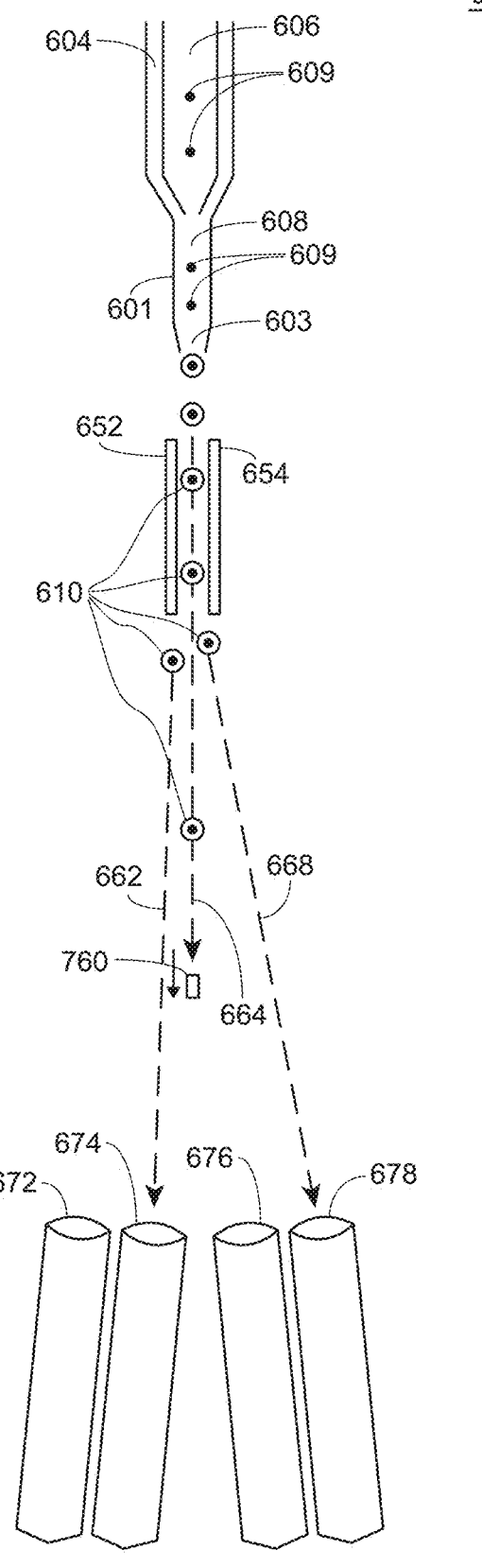

METHODS FOR DETERMINING PARTICLE POSITIONAL INFORMATION IN A FLOW CYTOMETER CORE STREAM AND SYSTEMS FOR SAME

CROSS-REFERENCE TO RELATED APPLICATIONS

This application claims priority to the filing date of U.S. Provisional Patent Application Ser. No. 63/394,415 filed on Aug. 2, 2022; the disclosure of which application is incorporated herein by reference.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector.

One technique that utilizes light detection to characterize the components in a sample is flow cytometry. A flow cytometer includes a photo-detection system made up of the optics, photodetectors and electronics that enable efficient detection of optical signals and its conversion to corresponding electric signals. The electronic signals are processed to obtain parameters that a user can utilize to perform desired analysis. A flow cytometer includes different types of photodetectors to detect a light signal, such as light signals from fluorescence, side scattered or front scattered light. When an optical signal is incident on the photodetectors, an electrical signal is produced at its output which is proportional to the incident optical signal. Flow cytometry provides a rapid method to quantify cell characteristics.

Light used to irradiate a flow stream in flow cytometers can have intensity profiles which differ across the irradiation spot, such as where the center of a laser beam has its highest power density and rapidly decreases further from the center of the beam spot. Particles which pass directly through the center of the beam spot receive greater laser power intensity than particles which do not pass through the center of the beam spot. In some instances, fluorophores present on particles passing through a periphery of a beam spot will be sub-optimally excited resulting in lower brightness and have greater noise in data signals from detected light.

SUMMARY

Aspects of the present disclosure include methods for determining position information for particles in a flow stream of a flow cytometer. Methods according to certain embodiments include propagating a composition having particles through a flow stream that includes a core stream and a sheath flow stream, irradiating the particles of the composition with a light source, detecting light from the irradiated particles, determining light emission from the irradiated particles of the composition and determining the position of the irradiated particles in the core stream of the flow stream based on the detected light emission. In embodiments, particles are stably associated with (e.g., are covalently bonded to) an irradiation power density-sensitive compound that emits light having an intensity that depends on irradiation power density of the light source incident on the particle. Systems (e.g., flow cytometers) for practicing the subject methods are also described. Non-transitory computer readable storage medium is also provided.

In practicing the subject methods, a composition having particles is irradiated with a light source in a flow stream having a core stream and a sheath flow stream. In embodiments, the composition includes particles that are stably associated with an irradiation power density-sensitive compound that emits light having an intensity that depends on the irradiation power density of the light source incident on the particles. In some instances, the irradiation power density-sensitive compound is covalently bonded to the particles in the composition through a linker. In certain instances, the linker is a cleavable linker. In certain instances, the linker is a non-cleavable linker. In certain instances, the irradiation power density-sensitive compound is associated with the particle through a specific binding member, such as an antibody. In certain embodiments, the composition is a biological composition and the particles are cells. In some embodiments, the irradiation power density-sensitive compounds are upconverting nanoparticles (UCNPs). In some instances, the nanoparticles are lanthanide-doped particles. In certain instances, the nanoparticles are europium-doped or thulium-doped nanoparticles, such as $NaYF4:Yb,Er$ nanoparticles or $NaYF4:YbTm$ nanoparticles.

In some embodiments, the irradiated particles in the composition have a spectral emission intensity profile that changes in response to the power density of the light source. In some instances, the irradiated particles of the composition have 2 or more emission peaks in response to irradiation by the light source. In certain instances, the intensity of each emission peak depends on the irradiation power density of the light source. In certain embodiments, one or more of the emission peaks has a first intensity at a first irradiation power density of the light source and a second intensity at a second irradiation power density of the light source. In certain instances, the irradiated particles of the composition have a first emission peak having a first intensity at a first irradiation power density and a second intensity at a second irradiation power density and a second emission peak having the same intensity at the first irradiation power density and the second irradiation power density.

In certain embodiments, the composition is irradiated in the flow stream with a light source (e.g., a laser) having a Gaussian beam power density profile across a horizontal axis of the core stream. In some instances, the core stream is irradiated with an elliptical beam spot having a long axis and a short axis, such as where the long axis of the beam spot is orthogonal to the horizontal axis of the core stream. In some instances, the laser is configured to irradiate the core stream such that the irradiation power density across the horizontal axis of the flow stream is greater in power density at or near the center of the core stream and is lower in power density at or near an edge of the core stream.

In some embodiments, the method includes determining the position of the irradiated particles of the composition based on a difference between the emission intensity of the first emission peak and the second emission peak. In some instances, the irradiated particles are determined to be propagated through the core stream at about the center of the irradiation position of the light source when the first emission peak and the second emission peak have about the same intensity. In some instances, the irradiated particles are determined to be propagated through the core stream at an edge of the irradiation position of the light source when the first emission peak and the second emission peak have different intensities. In some instances, the irradiated particles are determined to be propagated through the core stream at about the center of the core stream when the first emission peak and the second emission peak have about the same intensity. In some instances, the irradiated particles are determined to be propagated through the core stream at an edge of the core stream when the first emission peak and the second emission peak have different intensities.

In some instances, methods include determining that the irradiated particles are propagated through the flow stream at or near the center of the core stream. In some instances, methods include determining that the irradiated particles are propagated through the flow stream at or near an edge of the core stream. In certain instances, one or more particle population clusters are generated based on the determined position of the irradiated particles in the core stream. In some embodiments, particles determined to be propagated through the flow stream at or near the center of the core stream are clustered together. In some embodiments, particles determined to be propagated through the flow stream at or near an edge of the core stream are clustered together. In certain embodiments, data signals generated in response to light from irradiated particles of the composition determined to be propagated through the flow stream at or near an edge of the core stream are discarded.

Aspects of the present disclosure include systems for determining position information for particles in a flow stream. Systems according to certain embodiments include a flow cell configured to propagate a composition having particles in a flow stream that includes a core stream and a sheath flow stream, a light source for irradiating the particles of the composition, a light detection system for detecting light from the irradiated particles and a processor having memory operably coupled to the processor where the memory includes instructions stored thereon, which when executed by the processor, cause the processor to determine to determine a position of the particles in the flow stream based on the detected light emission from the irradiated particles.

In some embodiments, the light source includes one or more lasers. In some instances, the light source is a laser configured to have a Gaussian beam power density profile across a horizontal axis of the flow stream. In certain instances, the laser includes an elliptical beam spot having a long axis and a short axis. In some instances, the laser is configured to irradiate the core stream with the elliptical beam spot such that the long axis of the beam spot is orthogonal to the horizontal axis of the flow stream. In some instances, the laser is configured to irradiate the core stream such that the irradiation power density across the horizontal axis of the flow stream is greater in power density at or near the center of the core stream and is lower in power density at or near an edge of the core stream. In some embodiments, the light source includes an optical adjustment component configured to propagate light to the flow stream such that the long axis of the beam spot is orthogonal to the horizontal axis of the flow stream. In some instances, the optical adjustment component is configured to rotate the beam spot by 90°. In certain instances, the optical adjustment component includes one or more lenses. In some embodiments, the light source includes a plurality of lasers. In certain instances, the light source includes at least one laser having an elliptical beam spot having a long axis and a short axis that is configured to irradiate the flow stream such that the long axis of the beam spot is orthogonal to the longitudinal axis of the flow stream and a laser having an elliptical beam spot having a long axis and a short axis that is configured to irradiate the flow stream such that the long axis of the beam spot is orthogonal to the horizontal axis of the flow stream.

In some embodiments, systems include a processor comprising memory operably coupled to the processor wherein the memory comprises instructions stored thereon, which when executed by the processor, cause the processor to determine the position of the irradiated particles of the composition based on a difference between the emission intensity of a first emission peak and a second emission peak. In some instances, the memory includes instructions for determining that the irradiated particles are propagated through the core stream at about the center of the irradiation position of the light source when the first emission peak and the second emission peak have about the same intensity. In some instances, the memory includes instructions for determining that the irradiated particles are propagated through the core stream at an edge of the irradiation position of the light source when the first emission peak and the second emission peak have different intensities. In some instances, the memory includes instructions for determining that the irradiated particles are propagated through the core stream at about the center of the core stream when the first emission peak and the second emission peak have about the same intensity. In some instances, the memory includes instructions for determining that the irradiated particles are propagated through the core stream at an edge of the core stream when the first emission peak and the second emission peak have different intensities.

In some instances, the memory includes instructions for determining that the irradiated particles are propagated through the flow stream at or near the center of the core stream. In some instances, the memory includes instructions determining that the irradiated particles are propagated through the flow stream at or near an edge of the core stream. In certain instances, the memory includes instructions for generating one or more particle population clusters based on the determined position of the irradiated particles in the core stream. In some embodiments, the memory includes instructions for clustering together particles that are determined to be propagated through the flow stream at or near the center of the core stream are clustered together. In some embodiments, the memory includes instructions for clustering together particles that are determined to be propagated through the flow stream at or near an edge of the core stream are clustered together. In certain embodiments, the memory includes instructions for discarding data signals generated in response to light from irradiated particles of the composition determined to be propagated through the flow stream at or near an edge of the core stream.

Aspects of the present disclosure also include non-transitory computer readable storage medium for determining position information for particles of a composition (e.g., cells of a biological sample) in a flow cytometer. In embodiments, the non-transitory computer readable storage medium includes algorithm for propagating a composition having particles (e.g., cells) through a flow stream having a core stream and a sheath flow stream, algorithm for irradiating the particles of the composition with a light source, algorithm for detecting light from the irradiated particles, algorithm for determining emission intensity of the irradiated particles of the composition and algorithm for determining the position of the irradiated particles in the core stream of the flow stream based on the on the detected light emission from the irradiated particles.

In some embodiments, particles irradiated in the composition are stably associated with an irradiation power density-sensitive compound that emits light having an intensity that depends on irradiation power density of the light source incident on the particle. In some embodiments, the irradiated particles are configured to have a spectral emission intensity profile that changes in response to the power density of the light source, such as where the particles of the composition are configured to have 2 or more emission peaks in response to irradiation by the light source. In some instances, the intensity of each emission peak depends on the irradiation power density of the light source. In certain instances, one or more of the emission peaks has a first intensity at a first irradiation power density of the light source and a second intensity at a second irradiation power density of the light source. In certain embodiments, the particles of the composition have a first emission peak having a first intensity at a first irradiation power density and a second intensity at a second irradiation power density and a second emission peak having the same intensity at the first irradiation power density and the second irradiation power density.

In some embodiments, the non-transitory computer readable storage medium includes algorithm for determining the position of the irradiated particles of the composition based on a difference between the emission intensity of the first emission peak and the second emission peak. In some instances, the non-transitory computer readable storage medium includes algorithm for determining that the irradiated particles are propagated through the core stream at about the center of the irradiation position of the light source when the first emission peak and the second emission peak have about the same intensity. In some instances, the non-transitory computer readable storage medium includes algorithm for determining that the irradiated particles propagated through the core stream at an edge of the irradiation position of the light source when the first emission peak and the second emission peak have different intensities. In some instances, the non-transitory computer readable storage medium includes algorithm for determining that the irradiated particles are propagated through the core stream at about the center of the core stream when the first emission peak and the second emission peak have about the same intensity. In some instances, the non-transitory computer readable storage medium includes algorithm for determining that the irradiated particles are propagated through the core stream at an edge of the core stream when the first emission peak and the second emission peak have different intensities.

In certain embodiments, the non-transitory computer readable storage medium includes algorithm for generating one or more particle population clusters based on the determined position of the particle in the core stream. In certain instances, the non-transitory computer readable storage medium includes algorithm for clustering particles determined to be propagated through the flow stream at or near the center of the core stream. In certain instances, the non-transitory computer readable storage medium includes algorithm for clustering particles determined to be propagated through the flow stream at or near an edge of the core stream. In certain instances, the non-transitory computer readable storage medium includes algorithm for discarding data signals generated in response to light from irradiated particles determined to be propagated through the flow stream at or near an edge of the core stream.

BRIEF DESCRIPTION OF THE FIGURES

The invention may be best understood from the following detailed description when read in conjunction with the accompanying drawings. Included in the drawings are the following figures:

FIG. 2 depicts a flow chart for characterizing position information for particles of a composition according to certain embodiments.

FIG. 6A depicts a schematic drawing of a particle sorter system according to certain embodiments.

FIG. 6B depicts a schematic drawing of a particle sorter system according to certain embodiments.

DETAILED DESCRIPTION

Figure 1:
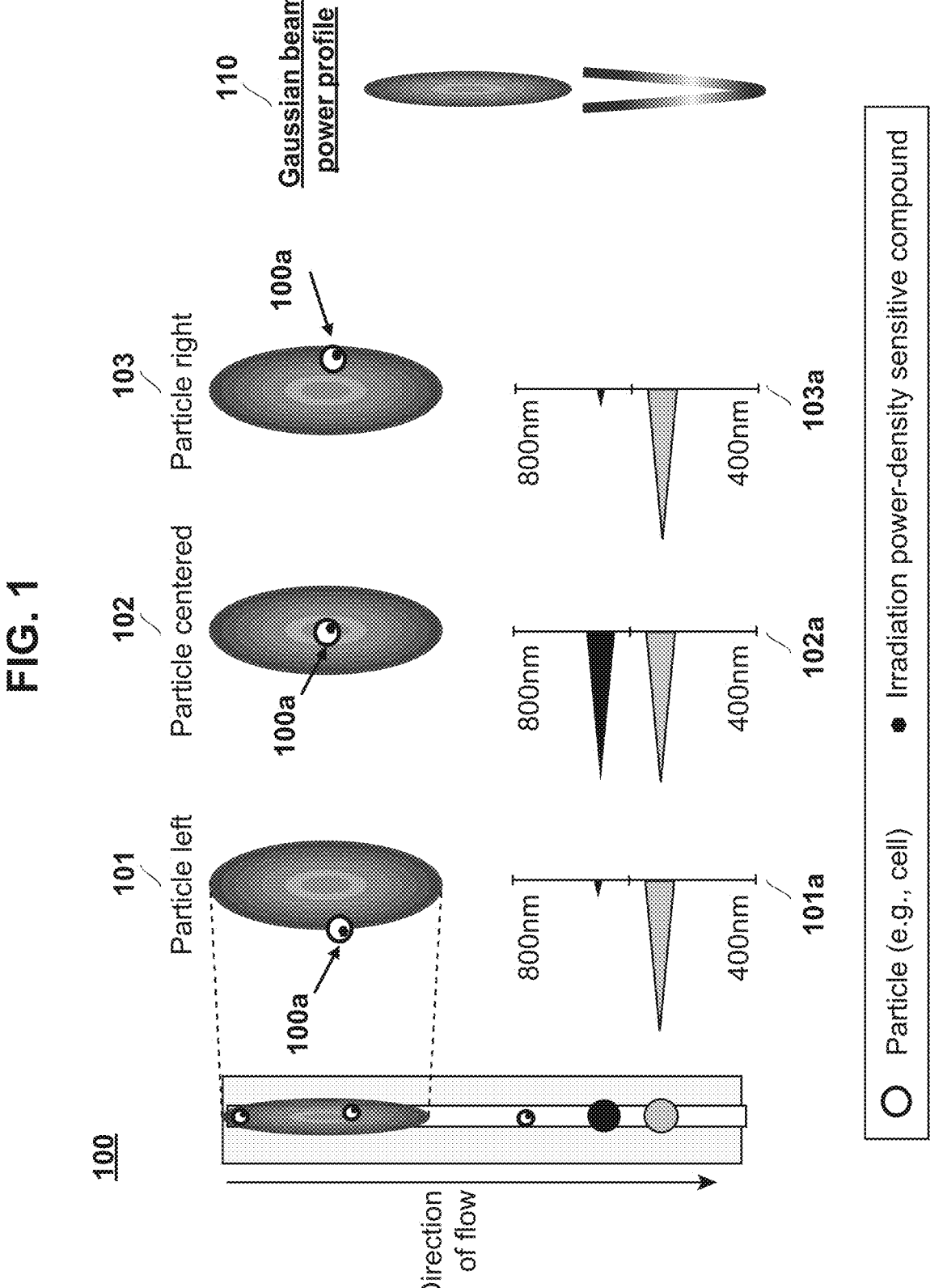
FIG. 1 depicts determining position information of particles of a composition in a core stream according to certain embodiments.

Aspects of the present disclosure include methods for determining position information for particles in a flow stream of a flow cytometer. Methods according to certain embodiments include propagating a composition having particles through a flow stream that includes a core stream and a sheath flow stream, irradiating the particles of the composition with a light source, detecting light from the irradiated particles, determining light emission from the irradiated particles of the composition and determining the position of the irradiated particles in the core stream of the flow stream based on the detected light emission. In embodiments, particles are stably associated with (e.g., are covalently bonded to) an irradiation power density-sensitive compound that emits light having an intensity that depends on irradiation power density of the light source incident on the particle. Systems (e.g., flow cytometers) for practicing the subject methods are also described. Non-transitory computer readable storage medium is also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for determining position information for particles in a flow stream in a flow cytometer. In further describing embodiments of the disclosure, methods for determining position information in a core stream of the flow stream for particles having an irradiation power density-sensitive compound that emits light having an intensity that depends on irradiation power density of the light source incident on the particle are first described. Next, systems (e.g., flow cytometers) that include a light source and a light detection system for practicing the subject methods are described. Non-transitory computer readable storage medium is also provided.

Methods for Determining Position Information for Particles in a Flow Stream of a Flow Cytometer Aspects of the present disclosure include methods for determining position information of particles in a flow stream of a flow cytometer. In some embodiments, the present disclosure provides methods for modifying or adjusting analysis of data signals for the particles of a sample composition based on the position information of the particles in the flow stream. In some embodiments, the subject methods provide for determining where the particles are flowing in the core stream of a flow stream that includes a core stream and a sheath flow stream. In some instances, particles may be determined to be flowing at or near the center of the core stream. In other instances, particles may be determined to be flowing at or near an edge of the core stream. In some embodiments, methods described herein provide for determining the position of one or more particles relative to the position of irradiation by a light source on the core stream. In some instances, particles in the composition are determined to be propagating through the core stream at a position that is at or near the center of irradiation by the light source. In other instances, particles in the composition are determined to be propagating through the core stream at a position that is at or near an edge of irradiation by the light source.

Light used to irradiate a flow stream in flow cytometers can have intensity profiles which differ across the irradiation spot, such as where the center of a laser beam has its highest power density and exhibits a decrease further from the center of the beam spot. Particles which pass directly through the center of the beam spot can receive greater laser power intensity than particles which do not pass through the center of the beam spot. In some instances, fluorophores present on particles passing through a periphery of a beam spot will be sub-optimally excited resulting in lower brightness and have greater noise in data signals from detected light. In some instances, methods for determining position information for particles in a core stream as described herein provide for less variation in the irradiation of particles in the core stream, such as where irradiation intensity incident on particles of the composition differs across the core stream by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as 0.01% or less and including by 0.001% or less. In certain embodiments, the subject methods provide for determining which particles in a sample composition are sub-optimally excited and adjusting or discarding data signals from particles which have been sub-optimally excited by irradiation with the light source. In certain embodiments, the subject methods increase the signal-to-noise ratio of data signals generated in response to light from the irradiated particles of a sample composition, such as by 5% or more, such as by 10% or more, such as by 25% or more, such as by 50% or more, such as by 75% or more, such as by 90% or more and including by 99% or more.

In practicing the subject methods, a composition having particles propagated through the core stream is irradiated with a light source. In some embodiments, the light source is a continuous wave light source, such as where the light source provides uninterrupted light flux and maintains irradiation of particles of the sample in the flow stream with little to no undesired changes in light intensity. In some embodiments, the continuous light source emits non-pulsed or non-stroboscopic irradiation. In certain embodiments, the continuous light source provides for substantially constant emitted light intensity. For instance, methods may include irradiating the sample in the flow stream with a continuous light source that provides for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In other embodiments, the composition in the flow stream is irradiated with a pulsed light source, such as where light is emitted at predetermined time intervals, each time interval having a predetermined irradiation duration (i.e., pulse width). In certain embodiments, methods include irradiating the sample with the pulsed light source in each interrogation region of the flow stream with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

The flow stream may be irradiated with any convenient light source and may include laser and non-laser light sources (e.g., light emitting diodes). In certain embodiments, methods include irradiating the particle with a laser, such as a pulsed or continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In some embodiments, the light source outputs a specific wavelength such as from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

The flow stream may be irradiated by the light source from any suitable distance, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, irradiation of the flow stream may be at any suitable angle such as at an angle ranging from 10° to 90°, such as from 15° to 85°, such as from 20° to 80°, such as from 25° to 75° and including from 30° to 60°, for example at a 90° angle.

In some embodiments, methods include further adjusting the light from the flow stream before detecting the light. For example, the light may be passed through one or more lenses, mirrors, pinholes, slits, gratings, light refractors, and any combination thereof. In some instances, the collected light is passed through one or more focusing lenses, such as to reduce the profile of the light. In other instances, the emitted light from the sample is passed through one or more collimators to reduce light beam divergence.

In certain embodiments, methods include irradiating the flow stream with two or more beams of frequency shifted light. A light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In certain instances, the flow stream is irradiated with a plurality of beams of frequency-shifted light and a cell in the flow stream is imaged by fluorescence imaging using radiofrequency tagged emission (FIRE) to generate a frequency-encoded image, such as those described in Diebold, et al. *Nature Photonics* Vol. 7 (10); 806-810 (2013), as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

In some instances, the core stream is irradiated with an elliptical beam spot having a long axis and a short axis, such as where the long axis of the beam spot is orthogonal to the horizontal axis of the core stream. In certain embodiments, the flow stream is irradiated with a light source (as described in greater detail below) having a Gaussian beam power density profile across a horizontal axis of the core stream. In some instances, the laser is configured to irradiate the core stream such that the irradiation power density across the horizontal axis of the flow stream is greater in power density at or near the center of the core stream and is lower in power density at or near an edge of the core stream. In some instances, the intensity profile of the output laser beam includes increasing intensity from the edges to the center of the output laser beam along the horizontal axis (i.e., short axis of the elliptical beam spot). In these instances, the intensity of the output laser beam at the edges of the output beam may range from 0.1% to about 99% of the intensity of the output at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including where the intensity of the output laser beam at the edges of the output beam is from about 10% to about 50% of the intensity of output laser beam at the center of the output laser beam along the horizontal axis. In still other instances, the intensity profile of the output laser beam includes a Gaussian distribution along the horizontal axis of the output laser beam. In yet other instances, the intensity profile of the output laser beam includes a super Gaussian distribution along the horizontal axis of the output laser beam.

In some embodiments, the laser includes an optical adjustment component (e.g., one or more lenses) which is configured to rotate the output laser beam by 90° such that the long axis of the elliptical beam spot is parallel with the longitudinal axis of the flow stream (i.e., the short axis of the elliptical beam spot irradiates across the horizontal axis of the flow stream). In some instances, the optical adjustment component is configured to generate an output laser beam such that the irradiation power density across the horizontal axis of the flow stream is greater in power density at or near the center of the core stream and is lower in power density at or near an edge of the core stream. In some instances, the light source includes an optical adjustment component to that provides for an intensity profile of an output laser beam having increasing intensity from the edges to the center of the output laser beam along the horizontal axis (i.e., short axis of the elliptical beam spot). In these instances, the optical adjustment component generates an output laser beam having an intensity at the edges that is from 0.1% to about 99% of the intensity of the output at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including where the intensity of the output laser beam at the edges of the output beam is from about 10% to about 50% of the intensity of output laser beam at the center of the output laser beam along the horizontal axis. In still other instances, the optical adjustment component generates an output laser beam having intensity profile that has a Gaussian distribution along the horizontal axis. In yet other instances, the optical adjustment component generates an output laser beam having intensity profile that has a super-Gaussian distribution along the horizontal axis.

Light from the irradiated flow stream is detected with a light detection system having a photodetector. Photodetectors may be any convenient light detecting protocol, including but not limited to photosensors or photodetectors, such as active-pixel sensors (APSs), avalanche photodiodes (APDs), quadrant photodiodes, image sensors, charge-coupled devices (CODs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Light may be measured by the photodetector at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths. In some embodiments, fluorescence from the sample is detected by the light detection system over one or more of the wavelength ranges of 200 nm-1200 nm. In some instances, methods include detecting fluorescence from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, methods include detecting fluorescence at one or more specific wavelengths. For example, the fluorescence may be detected at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof, depending on the number of different fluorescent light detectors in the subject light detection system. In certain embodiments, methods include detecting wavelengths of light which correspond to the fluorescence peak wavelength of certain fluorochromes present in the sample.

Light may be measured continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval. Measurements of the light from across the flow stream may be taken one or more times during each discrete time interval, such as 2 or more times, such as 3 or more times, such as 5 or more times and including 10 or more times. In certain embodiments, the light from the flow stream is measured by the photodetector 2 or more times, with the data in certain instances being averaged.

Each photodetector may be positioned at any suitable distance from the flow stream so long as a usable light signal is detectable. For example, detectors in the subject systems may be positioned 1 mm or more from the flow stream, such as 5 mm or more, such as 10 mm or more, such as 15 mm or more, such as 25 mm or more, such as 50 mm or more, such as 100 mm or more, such as 150 mm or more, such as 250 mm or more and including 500 mm or more from the flow stream. The detectors may also be positioned at any angle from the flow stream. For example, the detectors may be angled with respect to the vertical axis of the flow stream at from 10° to 90°, such as from 15° to 85°, such as from 20° to 80°, such as from 25° to 75° and including from 30° to 60°. In some instances, the one or more detectors are positioned at 30° to 60° with respect to the vertical axis of the flow stream.

In embodiments, light detection systems are configured to detect forward scattered light, side scattered light, emitted light, transmitted light or a combination thereof. In certain embodiments, the light signals from the irradiated flow stream may be detected by one or more detectors configured as forward scatter detectors. In these embodiments, the forward scatter detectors are positioned on the opposite side of the flow stream from the light source and are positioned to collect and detect forward propagated (e.g., scattered) light. In some embodiments, light from the irradiated sample in the flow stream is detected in one or more fluorescent detector channels. In some embodiments light from the irradiated flow stream is detected in one or more scattered light detector channels.

In some embodiments, methods include determining a spectral emission intensity profile for particles of a composition being propagated through a core stream of a flow stream. In some embodiments, the flow stream includes a core stream and a sheath flow stream which flows, such as by laminar flow, alongside the core stream. In some embodiments, the composition includes particles having an irradiation power density-sensitive compound that emits light having an intensity that depends on irradiation power density of the light source incident on the particle. In other words, the irradiated particles of the composition exhibit a change in property based on the intensity of irradiation by the light source. In some instances, the irradiated particles exhibit a change in emission intensity based on the intensity of irradiation by the light source incident on the particles. In some embodiments, the irradiated particles exhibit an increase in emission intensity in response to an increase in the irradiation power density of the light source incident on the particles. In some embodiments, the irradiated particles exhibit a decrease in emission intensity in response to an increase in the irradiation power density of the light source incident on the particles.

In some instances, the compositions described herein are biological samples and the particles are cells. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the composition is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In embodiments, each irradiation power density-sensitive compound is stably associated with the particle. By stably associated is meant that the irradiation power density-sensitive compound does not readily dissociate from the particle to contact with a liquid medium, e.g., an aqueous medium. In some embodiments, one or more of the irradiation power density-sensitive compounds are covalently conjugated to the particle. In other embodiments, one or more of the irradiation power density-sensitive compounds are physically associated (i.e., non-covalently coupled) to the particle. In other embodiments, one or more irradiation power density-sensitive compounds are covalently conjugated to the particle and one or more irradiation power density-sensitive compounds are physically associated with the particle.

In some embodiments, the irradiation power density-sensitive compounds are coupled to the particles in the composition. In some instances, the irradiation power density-sensitive compounds are bonded to the particles in the composition by one or more of hydrogen bonds, dipole-dipole interactions or ionic bonds. In some instances, the irradiation power density-sensitive compounds are covalently bonded to the particles in the composition. In some instances, the irradiation power density-sensitive compounds are directly covalently bonded to the particles. In some instances, irradiation power density-sensitive compounds are covalently bonded to the particles through a linker. The linker may be any convenient covalent linking protocol, such as a zero-length crosslinker, homobifunctional linker, heterobifunctional linker or a trifunctional crosslinker. In certain instances, the linker is a cleavable linker. In certain instances, the linker is a non-cleavable linker. The linker may include one or more functional groups, such as an amide, alkylamine, carbamate, carbonate, thiolether, alkyl, cycloalkyl or aryl moiety, as desired. In some embodiments, the linker includes a carbamate moiety. In certain instances, the linker includes a chemoselective functional group, e.g., for conjugation to a co-monomer or a biomolecule. In certain embodiments, the linker is an amine-containing linker. In some instances, the linker is an N-hydroxysuccinimide (NHS) ester having one or more maleimide groups that allow for conjugation with a sulfhydryl group. In certain embodiments, the irradiation power density-sensitive compound is covalently bonded to the particles in the composition through a linker such as described in U.S. Pat. No. 11,333,666; U.S. Patent Publication Nos. 20040142344, 20080293164, 20080064042, 20100136702, 20110256549, 20110257374, 20120028828, 20120252986, 20130190193, 20160264737, 20160266131, 20180231530, 20180009990, 20180009989, 20180163054 and 20220089877, the disclosures of which are herein incorporated by reference.

In some embodiments, the irradiation power density-sensitive compound is part of a labelled specific binding member. A labelled specific binding member is a conjugate of an irradiation power density-sensitive compound (e.g., as described herein) and a specific binding member. Any of the irradiation power density-sensitive compounds described herein may be conjugated to a specific binding member. The specific binding member and the irradiation power density-sensitive compound can be conjugated (e.g., covalently linked) to each other at any convenient locations of the two molecules, via an optional linker. In some embodiments, the labelled specific binding member is aggregation resistant. As used herein, by "aggregation-resistant" is meant a labelled specific binding member capable of forming a homogenous aqueous composition without aggregated precipitate at a concentration of 1 mg/ml or more in an aqueous buffer of interest, such as 2 mg/ml or more, 3 mg/ml or more, 4 mg/ml or more, 5 mg/ml or more, 6 mg/ml or more, 7 mg/ml or more, 8 mg/ml or more, 9 mg/ml or more, 10 mg/mL or more or even more of the labelled specific binding member.

As used herein, the term "specific binding member" refers to one member of a pair of molecules which have binding specificity for one another. One member of the pair of molecules may have an area on its surface, or a cavity, which specifically binds to an area on the surface of, or a cavity in, the other member of the pair of molecules. Thus the members of the pair have the property of binding specifically to each other to produce a binding complex. In some embodiments, the affinity between specific binding members in a binding complex is characterized by a $K_d$ (dissociation constant) of $10^{-6}$ M or less, such as $10^{-7}$ M or less, including $10^{-8}$ M or less, e.g., $10^{-9}$ M or less, $10^{-10}$ M or less, $10^{-11}$ M or less, $10^{-12}$ M or less, $10^{-13}$ M or less, $10^{-14}$ M or less, including $10^{-15}$ M or less. In some embodiments, the specific binding members specifically bind with high avidity. By high avidity is meant that the binding member specifically binds with an apparent affinity characterized by an apparent $K_d$ of $10 \times 10^{-9}$ M or less, such as $1 \times 10^{-9}$ M or less, $3 \times 10^{-10}$ M or less, $1 \times 10^{-10}$ M or less, $3 \times 10^{-11}$ M or less, $1 \times 10^{-11}$ M or less, $3 \times 10^{-12}$ M or less or $1 \times 10^{-12}$ M or less.

The specific binding member can be proteinaceous. As used herein, the term "proteinaceous" refers to a moiety that is composed of amino acid residues. A proteinaceous moiety can be a polypeptide. In certain cases, the proteinaceous specific binding member is an antibody. In certain embodiments, the proteinaceous specific binding member is an antibody fragment, e.g., a binding fragment of an antibody that specific binds to a polymeric dye. As used herein, the terms "antibody" and "antibody molecule" are used interchangeably and refer to a protein consisting of one or more polypeptides substantially encoded by all or part of the recognized immunoglobulin genes. The recognized immunoglobulin genes, for example in humans, include the kappa (k), lambda (I), and heavy chain genetic loci, which together comprise the myriad variable region genes, and the constant region genes mu (u), delta (d), gamma (g), sigma (e), and alpha (a) which encode the IgM, IgD, IgG, IgE, and IgA isotypes respectively. An immunoglobulin light or heavy chain variable region consists of a "framework" region (FR) interrupted by three hypervariable regions, also called "complementarity determining regions" or "CDRs". The extent of the framework region and CDRs have been precisely defined (see, "Sequences of Proteins of Immunological Interest," E. Kabat et al., U.S. Department of Health and Human Services, (1991)). The numbering of all antibody amino acid sequences discussed herein conforms to the Kabat system. The sequences of the framework regions of different light or heavy chains are relatively conserved within a species. The framework region of an antibody, that is the combined framework regions of the constituent light and heavy chains, serves to position and align the CDRs. The CDRs are primarily responsible for binding to an epitope of an antigen. The term antibody is meant to include full length antibodies and may refer to a natural antibody from any organism, an engineered antibody, or an antibody generated recombinantly for experimental, therapeutic, or other purposes as further defined below.

Antibody fragments of interest include, but are not limited to, Fab, Fab', F(ab')2, Fv, scFv, or other antigen-binding subsequences of antibodies, either produced by the modification of whole antibodies or those synthesized de novo using recombinant DNA technologies. Antibodies may be monoclonal or polyclonal and may have other specific activities on cells (e.g., antagonists, agonists, neutralizing, inhibitory, or stimulatory antibodies). It is understood that the antibodies may have additional conservative amino acid substitutions which have substantially no effect on antigen binding or other antibody functions.

In certain embodiments, the specific binding member is a Fab fragment, a $F(ab')_2$ fragment, a scFv, a diabody or a triabody. In certain embodiments, the specific binding member is an antibody. In some cases, the specific binding member is a murine antibody or binding fragment thereof. In certain instances, the specific binding member is a recombinant antibody or binding fragment thereof.

In certain embodiments, the irradiation power density-sensitive compound is associated with the particles of the composition through the specific binding member. For example, the irradiation power density-sensitive compound may be covalently bonded to a proteinaceous binding member such as an antibody or antibody fragment and the antibody or antibody fragment is associated with the particles of the composition. In certain embodiments, the irradiation power density-sensitive compound is covalently bonded (e.g., directly or through a linker) to a binding member having binding specificity for a receptor on the surface of the particle, such as a surface bound protein or antigen.

The irradiation power density-sensitive compounds may be any compound which exhibits a change in property, such as a characteristic in emission spectral profile or intensity in response to changes in the power density of irradiation by a light source. In some embodiments, the irradiation power density-sensitive compounds are upconverting nanoparticles (UCNPs). In some instances, the nanoparticles are lanthanide-doped particles. In certain instances, the nanoparticles are europium-doped or thulium-doped nanoparticles, such as NaYF4:Yb,Er nanoparticles or NaYF4:YbTm nanoparticles.

In certain embodiments, the irradiated particles in the composition have a spectral emission intensity profile that changes in response to the power density of the light source. In some embodiments, the irradiated particles of the composition have 2 or more emission peaks in response to irradiation by the light source, such as 3 or more, such as 4 or more, such as 5 or more, such as 6 or more, such as 7 or more, such as 8 or more, such as 9 or more and including 10 or more emission peaks. In certain instances, one or more peaks of the spectral profile exhibits a change in intensity in response to the power density of the light source. In certain instances, the intensity of each emission peak depends on the irradiation power density of the light source. In one example, one or more of the emission peaks has a first emission intensity at a first irradiation power density of the light source and a second emission intensity at a second irradiation power density of the light source. In some instances, the emission peak has a higher emission intensity at a higher irradiation power density of the light source and a lower emission intensity at a lower irradiation power density. In certain instances, one or more of the emission peaks has a first emission intensity when the particle is propagated through the core stream at or near the center of irradiation by the light source and a second emission intensity when the particle is propagated through the core stream at or near an edge of irradiation by the light source. In these instances, where the center of the core stream is aligned with the center of irradiation by the light source (e.g., the center of the beam spot is at the center of the core stream) the one or more of the emission peaks has a first emission intensity when the particle is propagated at or near the center of the core stream and a second emission intensity when the particle is propagated at or near an edge of the core stream.

In some embodiments, methods include determining position information for an irradiated particle of the composition based on the emission intensity of one or more emission peaks. In one example, the particle is determined to be propagated at or near the center of the core stream when the emission peak exhibits a high emission intensity and the particle is determined to be propagated at or near an edge of the core stream when the emission peak exhibits a low emission intensity. In another example, the particle is determined to be propagated at or near the center of the core stream when the emission peak exhibits a low emission intensity and the particle is determined to be propagated at or near an edge of the core stream when the emission peak exhibits a high emission intensity.

In certain embodiments, the irradiated particles of the composition have a first emission peak having a first intensity at a first irradiation power density and a second intensity at a second irradiation power density and a second emission peak having the same intensity at the first irradiation power density and the second irradiation power density. In these embodiments, the intensity of the first emission peak depends on the irradiation power density of the light source while the intensity of the second emission peak stays the same. In one example, the first emission peak has a higher emission intensity at a higher irradiation power density of the light source and a lower emission intensity at a lower irradiation power density. The second emission peak has the same emission intensity at the higher and lower irradiation power densities of the light source. In certain instances, the first emission peak has a first emission intensity when the particle is propagated through the core stream at or near the center of irradiation by the light source and a second emission intensity when the particle is propagated through the core stream at or near an edge of irradiation by the light source. The second emission peak has the same emission intensity when the particle is propagated through the core stream at or near the center of irradiation by the light source and when the particle is propagated through the core stream at or near an edge of irradiation by the light source. In these instances, where the center of the core stream is aligned with the center of irradiation by the light source (e.g., the center of the beam spot is at the center of the core stream) the first emission peak has a first emission intensity when the particle is propagated at or near the center of the core stream and a second emission intensity when the particle is propagated at or near an edge of the core stream. The second emission peak has the same emission intensity when the particle is propagated at or near the center of the core stream and when the particle is propagated at or near an edge of the core stream.

In some embodiments, methods include determining position information for an irradiated particle of the composition based on the emission intensity of the first and second emission peaks. In one example, the particle is determined to be propagated at or near the center of the core stream when the first emission peak exhibits a high emission intensity and the particle is determined to be propagated at or near an edge of the core stream when the first emission peak exhibits a low emission intensity. In another example, the particle is determined to be propagated at or near the center of the core stream when the first emission peak exhibits a low emission intensity and the particle is determined to be propagated at or near an edge of the core stream when the first emission peak exhibits a high emission intensity.

In other instances, methods include determining the position of the particle based on the ratio of the intensity of the first emission peak and the intensity of the second emission peak. In some instances, the ratio of the intensity of the first emission peak and the intensity of the second emission peak ranges from 1:100 to 100:1, such as from 1:75 to 75:1, such as from 1:50 to 50:1, such as from 1:25 to 25:1, such as from 1:10 to 10:1, such as from 1:9 to 9:1, such as from 1:8 to 8:1, such as from 1:7 to 7:1, such as from 1:6 to 6:1, such as from 1:5 to 5:1 and including from 1:4 to 4:1. In certain embodiments, the particle is determined to be propagated at or near the center of the core stream when the ratio of the intensity of the first emission peak and the intensity of the second emission peak is from 0.7:1 to 1:0.7, such as from 0.8:1 to 1:0.8, such as from 0.9:1 to 1:0.9 and including from 0.95:1 to 1:0.95. In certain instances, the particle is determined to be propagated at or near the center of the core stream when the ratio of the intensity of the first emission peak and the intensity of the second emission peak is about 1:1 (i.e., the particle is propagated through the center of the core stream (or at the center of irradiation by the light source when the first emission peak and the second emission peak have about the same emission intensity). In some embodiments, the greater the ratio of the intensity of the first emission peak and the intensity of the second emission peak, the greater the distance from the center of irradiation (or center of the core stream when the light source and core stream are aligned) the particle is being propagated.

FIG. 1 depicts determining position information of particles of a composition in a core stream according to certain embodiments. Particles (e.g., cells) coupled to (e.g., covalently bonded) an irradiation power density-sensitive compound are irradiated in a flow stream at 100 with a light source exhibiting an elliptical beam spot where the short axis of the elliptical beam spot is orthogonal to the longitudinal axis of them flow stream (i.e., the long axis of the beam spot is parallel with the longitudinal long axis of the flow stream). In embodiments, the beam spot across the horizontal axis exhibits an irradiation power density where the center has a higher intensity than the intensity at or near the edges of the beam spot. As shown in FIG. 1, the flow stream is irradiated with an output laser beam having Gaussian beam profile 110. Light source having Gaussian beam profile 110 exhibits an irradiation power density having greater intensity at or near the center of irradiation and decreasing intensity further from the center. Irradiation power density of the light source with Gaussian beam profile 110 is lowest at or near the edge of irradiation. Particle 100a exhibits a spectral emission profile having two emission peaks at 400 nm and 800 nm. Particle 100a propagating through the left edge of irradiation 101 by the light source exhibits a spectral profile 101a where the emission peak at 400 nm is greater than the emission peak at 800 nm (i.e., the ratio of emission intensity at 400 nm to emission intensity at 800 nm is greater than 1). Particle 100a propagating through the center of irradiation 102 by the light source exhibits a spectral profile 102a where the emission peak at 400 nm is about the same as the emission peak at 800 nm (i.e., the ratio of emission intensity at 400 nm to emission intensity at 800 nm is about 1). Particle 100a propagating through the right edge of irradiation 103 by the light source exhibits a spectral profile 103a where the emission peak at 400 nm is greater than the emission peak at 800 nm (i.e., the ratio of emission intensity at 400 nm to emission intensity at 800 nm is greater than 1). Based on the difference in intensity between the emission peaks at 400 nm and 800 nm, the position of the particle can be determined. Where the light source with Gaussian beam profile 110 is aligned with the core stream of flow stream 100, the position of the particle in the core stream can be determined. In instances where the emission peaks at 400 nm and at 800 nm have about the same intensity, the particle is determined to be propagating at or near the center of the core stream. In instances where the emission peaks at 400 nm and at 800 nm have different intensities, the particle is determined to be propagating at or near an edge of the core stream. In certain instances, the distance from the center of the core stream is determined based on the ratio in intensity between the emission peaks at 400 nm and at 800 nm.

In certain embodiments, one or more particle population clusters are generated based on the determined position of the irradiated particles in the core stream. In some instances, particles are classified as being irradiated at or near the center of the core stream based on the determined spectral emission intensity profile. In other instances, particles are classified as being irradiated at or near an edge of the core stream based on the determined spectral emission intensity profile. In some instances, data signals from particles classified as being irradiated at or near the center of the core stream are clustered together. In some instances, data signals from particles classified as being irradiated at or near an edge of the core stream are clustered together. In certain embodiments, data signals from particles of the sample composition classified as being irradiated at or near an edge of the core stream are discarded.

FIG. 2 depicts a flow chart for characterizing position information for particles of a composition according to certain embodiments. Particles coupled to an irradiation power density-sensitive compound (e.g., as depicted in FIG. 1) are of a composition are irradiated with a light source in a core stream at step 201. Light from the irradiated particles is detected with a light detection system and at step 202 and data signals with the are generated for the particles of the composition at step 203. Using the generated data signals for the particles of composition, position information for the particles of the sample composition is determined at step 204. Data signals from particles of the composition may be clustered together based on the determined position of the particles in the core stream. In some instances, particles propagated at or near the center of the core stream are clustered together at step 205a whereas particles propagated at or near an edge of the core stream are clustered together at step 205b. In certain embodiments, data signals from particles of the composition that are determined to be propagated at or near an edge of the core stream (step 210) at discarded from further analysis.

In certain embodiments, the particles of the composition further include one or more stably associated (e.g., through covalent bonds or through a specific binding member as described above) fluorophores. In some embodiments, each particle includes 2 or more different types of fluorophores. Any two fluorophores are considered to be different a distinct if they differ from each other by one or more of molecular formula, excitation maximum and emission maximum. As such, different or distinct fluorophores may differ from each other in terms of chemical composition or in terms of one or more properties of the fluorophore. For instance, different fluorphores may differ from each other by at least one of excitation maxima and emission maxima. In some cases, different fluorophores differ from each other by their excitation maxima. In some cases, different fluorophores differ from each other by their emission maxima. In some cases, different fluorophores differ from each other by both their excitation maxima and emission maxima. As such, in embodiments that include first and second fluorophores, the first and second fluorophore may differ from each other by at least one of excitation maxima and emission maxima. For example, the first and second fluorophore may differ from each other by excitation maxima, by emission maxima, or by both excitation and emission maxima. A given set of fluorophores may be considered distinct if they differ from each other in terms of excitation or emission maximum, where the magnitude of such difference is, in some instances, 5 nm or more, such 10 nm or more, including 15 nm or more, wherein in some instances the magnitude of the difference ranges from 5 to 400 nm, such as 10 to 200 nm, including 15 to 100 nm, such as 25 to 50 nm.

Fluorophores of interest according to certain embodiments have excitation maxima that range from 100 nm to 800 nm, such as from 150 nm to 750 nm, such as from 200 nm to 700 nm, such as from 250 nm to 650 nm, such as from 300 nm to 600 nm and including from 400 nm to 500 nm. Fluorophores of interest according to certain embodiments have emission maxima that range from 400 nm to 1000 nm, such as from 450 nm to 950 nm, such as from 500 nm to 900 nm, such as from 550 nm to 850 nm and including from 600 nm to 800 nm. In certain instances, the fluorophore is a light emitting dye such as a fluorescent dye having a peak emission wavelength of 200 nm or more, such as 250 nm or more, such as 300 nm or more, such as 350 nm or more, such as 400 nm or more, such as 450 nm or more, such as 500 nm or more, such as 550 nm or more, such as 600 nm or more, such as 650 nm or more, such as 700 nm or more, such as 750 nm or more, such as 800 nm or more, such as 850 nm or more, such as 900 nm or more, such as 950 nm or more, such as 1000 nm or more and including 1050 nm or more. For example, the fluorophore may be a fluorescent dye having a peak emission wavelength that ranges from 200 nm to 1200 nm, such as from 300 nm to 1100 nm, such as from 400 nm to 1000 nm, such as from 500 nm to 900 nm and including a fluorescent dye having a peak emission wavelength of from 600 nm to 800 nm. In certain embodiments, the subject multispectral particles provide for stable excitation by lasers which irradiate at a wavelength at or about 349 nm (UV laser), 488 nm (blue laser), 532 nm (Nd:YAG solid state laser), 640 nm (red laser) and 405 nm (violet laser). In certain instances, the subject multispectral particles provide for stable excitation by a light source across a full spectral detection band, such as from 350 nm to 850 nm.

In some instances, each particle includes a fluorophore which emits fluorescence in response to irradiation by the light source. In some embodiments, fluorophores of interest may include but are not limited to dyes suitable for use in analytical applications (e.g., flow cytometry, imaging, etc.), such as an acridine dye, anthraquinone dyes, arylmethane dyes, diarylmethane dyes (e.g., diphenyl methane dyes), chlorophyll containing dyes, triarylmethane dyes (e.g., triphenylmethane dyes), azo dyes, diazonium dyes, nitro dyes, nitroso dyes, phthalocyanine dyes, cyanine dyes, asymmetric cyanine dyes, quinon-imine dyes, azine dyes, eurhodin dyes, safranin dyes, indamins, indophenol dyes, fluorine dyes, oxazine dye, oxazone dyes, thiazine dyes, thiazole dyes, xanthene dyes, fluorene dyes, pyronin dyes, fluorine dyes, rhodamine dyes, phenanthridine dyes, as well as dyes combining two or more of the aforementioned dyes (e.g., in tandem), polymeric dyes having one or more monomeric dye units and mixtures of two or more of the aforementioned dyes thereof. A large number of dyes are commercially available from a variety of sources, such as, for example, Molecular Probes (Eugene, OR), Dyomics GmbH (Jena, Germany), Sigma-Aldrich (St. Louis, MO), Sirigen, Inc. (Santa Barbara, CA) and Exciton (Dayton, OH). For example, the fluorophore may include 4-acetamido-4'-iso-thiocyanatostilbene-2,2'disulfonic acid; acridine and derivatives such as acridine, acridine orange, acridine yellow, acridine red, and acridine isothiocyanate; allophycocyanin, phycoerythrin, peridinin-chlorophyll protein, 5-(2'-amino-ethyl)aminonaphthalene-1-sulfonic acid (EDANS); 4-amino-N-[3 -vinylsulfonyl)phenyl]naphthalimide-3,5 disulfonate (Lucifer Yellow VS); N-(4-anilino-1 -naphthyl) maleimide; anthranilamide; Brilliant Yellow; coumarin and derivatives such as coumarin, 7-amino-4-methylcoumarin (AMC, Coumarin 120), 7-amino-4-trifluoromethylcouluarin (Coumaran 151); cyanine and derivatives such as cyanosine, Cy3, Cy3.5, Cy5, Cy5.5, and Cy7; 4',6-diaminidino-2-phenylindole (DAPI); 5',5"-dibromopyrogallol-sulfonephthalein (Bromopyrogallol Red); 7-diethylamino-3-(4'-isothiocyanatophenyl)-4-methylcoumarin; diethylaminocoumarin; diethylenetriamine pentaacetate; 4,4'-diisothiocyanatodi-hydro-stilbene-2,2'-disulfonic acid; 4,4'-diisothiocyanatos-tilbene-2,2'-disulfonic acid; 5-[dimethylamino]naphthalene-1-sulfonyl chloride (DNS, dansyl chloride); 4-(4'-dimethylaminophenylazo)benzoic acid (DABCYL); 4-dimethylaminophenylazophenyl-4'-isothiocyanate (DABITC); eosin and derivatives such as eosin and eosin isothiocyanate; erythrosin and derivatives such as erythrosin B and erythrosin isothiocyanate; ethidium; fluorescein and derivatives such as 5-carboxyfluorescein (FAM), 5-(4,6-dichlorotriazin-2-yl)aminofluorescein (DTAF), 2'7'-dime-thoxy-4'5'-dichloro-6-carboxyfluorescein (JOE), fluorescein isothiocyanate (FITC), fluorescein chlorotriazinyl, naphtho-fluorescein, and QFITC (XRITC); fluorescamine; IR144; IR1446; Green Fluorescent Protein (GFP); Reef Coral Fluo-rescent Protein (RCFP); Lissamine™; Lissamine rhod-amine, Lucifer yellow; Malachite Green isothiocyanate; 4-methylumbelliferone; ortho cresolphthalein; nitrotyrosine; pararosaniline; Nile Red; Oregon Green; Phenol Red; B-phycoerythrin; o-phthaldialdehyde; pyrene and deriva-tives such as pyrene, pyrene butyrate and succinimidyl 1-pyrene butyrate; Reactive Red 4 (Cibacron™ Brilliant Red 3B-A); rhodamine and derivatives such as 6-carboxy-X-rhodamine (ROX), 6-carboxyrhodamine (R6G), 4,7-di-chlororhodamine lissamine, rhodamine B sulfonyl chloride, rhodamine (Rhod), rhodamine B, rhodamine 123, rhod-amine X isothiocyanate, sulforhodamine B, sulforhodamine 101, sulfonyl chloride derivative of sulforhodamine 101 (Texas Red), N,N,N',N'-tetramethyl-6-carboxyrhodamine (TAMRA), tetramethyl rhodamine, and tetramethyl rhod-amine isothiocyanate (TRITC); riboflavin; rosolic acid and terbium chelate derivatives; xanthene; dye-conjugated poly-mers (i.e., polymer-attached dyes) such as fluorescein iso-thiocyanate-dextran as well as dyes combining two or more dyes (e.g., in tandem), polymeric dyes having one or more monomeric dye units and mixtures of two or more of the aforementioned dyes or combinations thereof.

In some instances, the fluorophore is polymeric dye. In some instances of the method, the polymeric dye includes a conjugated polymer. Conjugated polymers (CPs) are char-acterized by a delocalized electronic structure which includes a backbone of alternating unsaturated bonds (e.g., double and/or triple bonds) and saturated (e.g., single bonds) bonds, where π-electrons can move from one bond to the other. As such, the conjugated backbone may impart an extended linear structure on the polymeric dye, with limited bond angles between repeat units of the polymer. For example, proteins and nucleic acids, although also poly-meric, in some cases do not form extended-rod structures but rather fold into higher-order three-dimensional shapes. In addition, CPs may form "rigid-rod" polymer backbones and experience a limited twist (e.g., torsion) angle between monomer repeat units along the polymer backbone chain. In some instances, the polymeric dye includes a CP that has a rigid rod structure. The structural characteristics of the polymeric dyes can have an effect on the fluorescence properties of the molecules.

Polymeric dyes of interest include, but are not limited to, those dyes described by Gaylord et al. in U.S. Publication Nos. 20040142344, 20080293164, 20080064042, 20100136702, 20110256549, 20110257374, 20120028828, 20120252986, 20130190193, 20160264737, 20160266131, 20180231530, 20180009990, 20180009989, and 20180163054, the disclosures of which are herein incorpo-rated by reference in their entirety; and Gaylord et al., J. Am. Chem. Soc., 2001, 123 (26), pp 6417-6418; Feng et al., Chem. Soc. Rev., 2010,39, 2411-2419; and Traina et al., J. Am. Chem. Soc., 2011, 133 (32), pp 12600-12607, the disclosures of which are herein incorporated by reference in their entirety.

The polymeric dye may have one or more desirable spectroscopic properties, such as a particular absorption maximum wavelength, a particular emission maximum wavelength, extinction coefficient, quantum yield, and the like (see e.g., Chattopadhyay et al., "Brilliant violet fluoro-phores: A new class of ultrabright fluorescent compounds for immunofluorescence experiments." Cytometry Part A, 81A (6), 456-466, 2012). In some embodiments, the polymeric dye has an absorption curve between 280 nm and 475 nm. In certain embodiments, the polymeric dye has an absorp-tion maximum (excitation maximum) in the range 280 nm and 475 nm. In some embodiments, the polymeric dye absorbs incident light having a wavelength in the range between 280 nm and 475 nm. In some embodiments, the polymeric dye has an emission maximum wavelength rang-ing from 400 nm to 850 nm, such as 415 nm to 800 nm, where specific examples of emission maxima of interest include, but are not limited to: 421 nm, 510 nm, 570 nm, 602 nm, 650 nm, 711 nm and 786 nm. In some instances, the polymeric dye has an emission maximum wavelength in a range selected from the group consisting of 410 nm to 430 nm, 500 nm to 520 nm, 560 nm to 580 nm, 590 nm to 610 nm, 640 nm to 660 nm, 700 nm to 720 nm, and 775 nm to 795 nm. In certain embodiments, the polymeric dye has an emission maximum wavelength of 421 nm. In some instances, the polymeric dye has an emission maximum wavelength of 510 nm. In some cases, the polymeric dye has an emission maximum wavelength of 570 nm. In certain embodiments, the polymeric dye has an emission maximum wavelength of 602 nm. In some instances, the polymeric dye has an emission maximum wavelength of 650 nm. In certain cases, the polymeric dye has an emission maximum wave-length of 711 nm. In some embodiments, the polymeric dye has an emission maximum wavelength of 786 nm. In certain instances, the polymeric dye has an emission maximum wavelength of 421 nm±5 nm. In some embodiments, the polymeric dye has an emission maximum wavelength of 510 nm±5 nm. In certain instances, the polymeric dye has an emission maximum wavelength of 570 nm 35 5 nm. In some instances, the polymeric dye has an emission maximum wavelength of 602 nm±5 nm. In some embodiments, the polymeric dye has an emission maximum wavelength of 650 nm±5 nm. In certain instances, the polymeric dye has an emission maximum wavelength of 711 nm±5 nm. In some cases, the polymeric dye has an emission maximum wavelength of 786 nm±5 nm. In certain embodiments, the polymeric dye has an emission maximum selected from the group consisting of 421 nm, 510 nm, 570 nm, 602 nm, 650 nm, 711 nm and 786 nm.

Specific polymeric dyes that may be employed include, but are not limited to, BD Horizon Brilliant™ Dyes, such as BD Horizon Brilliant™ Violet Dyes (e.g., BV421, BV510, BV605, BV650, BV711, BV786); BD Horizon Brilliant™ Ultraviolet Dyes (e.g., BUV395, BUV496, BUV737, BUV805); and BD Horizon Brilliant™ Blue Dyes (e.g., BB515) (BD Biosciences, San Jose, CA).

Systems Configured for Determining Position Information for Particles in a Flow Stream Aspects of the present disclosure include systems for determining position information for particles in a flow stream. Systems according to certain embodiments include a flow cell configured to propagate a composition having particles in a flow stream that includes a core stream and a sheath flow stream, a light source for irradiating the particles of the composition, a light detection system for detecting light from the irradiated particles and a processor having memory operably coupled to the processor where the memory includes instructions stored thereon, which when executed by the processor, cause the processor to determine to determine a position of the particles in the flow stream based on the detected light emission from the irradiated particles. In some embodiments, particles irradiated in the composition are stably associated with an irradiation power density-sensitive compound that emits light having an intensity that depends on irradiation power density of the light source incident on the particle.

In embodiments, systems include a light source for irradiating the flow stream. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO4 laser, Nd:YCa4O(BO3)3 laser, Nd:YCOB laser, titanium sapphire laser, thulim YAG laser, ytterbium YAG laser, ytterbium2O3 laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400

MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1μm or more, such as an overlap of 5μm or more, such as an overlap of 10μm or more and including an overlap of 100 μm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

The light source may be positioned any suitable distance from the flow stream, such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or. In addition, the light source irradiate the flow stream at any suitable angle (e.g., relative the vertical axis of the flow stream), such as at an angle ranging from 10° to 90°, such as from 15° to 85°, such as from 20° to 80°, such as from 25° to 75° and including from 30° to 60° , for example at a 90° angle.

The light source may be configured to irradiate the composition in the flow stream continuously or in discrete intervals. In some instances, systems include a light source that is configured to irradiate the sample continuously, such as with a continuous wave laser that continuously irradiates the flow stream at the interrogation point in a flow cytometer. In other instances, systems of interest include a light source that is configured to irradiate the sample at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where the light source is configured to irradiate the sample at discrete intervals, systems may include one or more additional components to provide for intermittent irradiation of the sample with the light source. For example, the subject systems in these embodiments may include one or more laser beam choppers, manually or computer-controlled beam stops for blocking and exposing the sample to the light source.

In some instances, the light source is configured to irradiate the core stream with an elliptical beam spot having a long axis and a short axis, such as where the long axis of the beam spot is orthogonal to the horizontal axis of the core stream. In certain embodiments, the flow stream is irradiated with a light source (as described in greater detail below) having a Gaussian beam power density profile across a horizontal axis of the core stream. In some instances, the laser is configured to irradiate the core stream such that the irradiation power density across the horizontal axis of the flow stream is greater in power density at or near the center of the core stream and is lower in power density at or near an edge of the core stream. In some instances, the intensity profile of the output laser beam includes increasing intensity from the edges to the center of the output laser beam along the horizontal axis (i.e., short axis of the elliptical beam spot). In these instances, the intensity of the output laser beam at the edges of the output beam may range from 0.1% to about 99% of the intensity of the output at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including where the intensity of the output laser beam at the edges of the output beam is from about 10% to about 50% of the intensity of output laser beam at the center of the output laser beam along the horizontal axis. In still other instances, the intensity profile of the output laser beam includes a Gaussian distribution along the horizontal axis of the output laser beam. In yet other instances, the intensity profile of the output laser beam includes a super Gaussian distribution along the horizontal axis of the output laser beam.

In some embodiments, the laser includes an optical adjustment component (e.g., one or more lenses) which is configured to rotate the output laser beam by 90° such that the long axis of the elliptical beam spot is parallel with the longitudinal axis of the flow stream (i.e., the short axis of the elliptical beam spot irradiates across the horizontal axis of the flow stream). In some instances, the optical adjustment component is configured to generate an output laser beam such that the irradiation power density across the horizontal axis of the flow stream is greater in power density at or near the center of the core stream and is lower in power density at or near an edge of the core stream. In some instances, the light source includes an optical adjustment component to that provides for an intensity profile of an output laser beam having increasing intensity from the edges to the center of the output laser beam along the horizontal axis (i.e., short axis of the elliptical beam spot). In these instances, the optical adjustment component generates an output laser beam having an intensity at the edges that is from 0.1% to about 99% of the intensity of the output at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including where the intensity of the output laser beam at the edges of the output beam is from about 10% to about 50% of the intensity of output laser beam at the center of the output laser beam along the horizontal axis. In still other instances, the optical adjustment component generates an output laser beam having intensity profile that has a Gaussian distribution along the horizontal axis. In yet other instances, the optical adjustment component generates an output laser beam having intensity profile that has a super-Gaussian distribution along the horizontal axis.

In some embodiments, the light source includes a plurality of lasers. In certain instances, the light source includes a plurality of lasers where a first laser is positioned to irradiate the flow stream at a first position, a second laser is positioned to irradiate the flow stream at a second position, a third laser is positioned to irradiate the flow stream at a third position, and a fourth laser is positioned to irradiate the flow stream at a fourth position, where the second position is downstream from the first position, the third position is downstream from the second position and the fourth position is downstream from the third position. In certain embodiments, the first laser is a trigger laser, such as where the system is configured to trigger after emitted light from particles irradiated by the second laser has been detected by the light detection system. In certain instances, the light source includes at least one laser having an elliptical beam spot having a long axis and a short axis that is configured to irradiate the flow stream such that the long axis of the beam spot is orthogonal to the longitudinal axis of the flow stream and a laser having an elliptical beam spot having a long axis and a short axis that is configured to irradiate the flow stream such that the long axis of the beam spot is orthogonal to the horizontal axis of the flow stream.

The distance between irradiation on the flow stream by each of the lasers may vary, where the inter-irradiation space is independently 0.0001 μm or more, such as 0.0005 μm or more, such as 0.001 μm or more, such as 0.005 μm or more, such as 0.01 μm or more, such as 0.05 μm or more, such as 0.1 μm or more, such as 0.5 μm or more, such as 1 μm or more, such as 2 μm or more, such as 3 μm or more, such as 4 μm or more, such as 5 μm or more, such as 6 μm or more, such as 7 μm or more, such 8 μm or more, such as 9 μm or more and including 10 μm or more. In certain instances, the lasers in the subject light sources are configured to irradiate positions on the flow stream that are immediately adjacent to each other (i.e., there is no inter-irradiation space).

Depending on the desired wavelengths of light produced in the output laser beam (e.g., for use in irradiating a sample in a flow stream), each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 628 nm laser. In some embodiments, each of the lasers outputs a different wavelength of light. In certain instances, lasers of the systems are positioned such that each downstream laser outputs a longer wavelength of light. For example, where the system includes four lasers, the wavelength of light from the second laser is longer than the wavelength of light from the first laser, the wavelength of light from the third laser is longer than the wavelength of light from the second laser and the wavelength of light from the fourth laser is longer than the wavelength of light from the third laser. In certain instances, the system includes four lasers where the wavelength of light from the first laser is 488 nm, the wavelength of light from the second laser is 405 nm, the wavelength of light from the third laser is 561 nm and the wavelength of light from the fourth laser is 628 nm. In certain embodiments, light from the second laser is configured to have a Gaussian beam power density profile across a horizontal axis of the flow stream. In certain instances, the second laser includes an elliptical beam spot having a long axis and a short axis. In some embodiments, the second laser is coupled to an optical adjustment component configured to propagate light to the flow stream such that the long axis of the beam spot is orthogonal to the horizontal axis of the flow stream. In some instances, the optical adjustment component is configured to rotate the beam spot generated by the second laser by 90°. In certain instances, the optical adjustment component includes one or more lenses. In certain instances, the first, third and fourth lasers are configured to have a long axis and a short axis and are coupled to an optical adjustment component that propagates light from the first, third and fourth lasers to the flow stream such that the long axis of these beam spots are orthogonal to the horizontal axis of the flow stream.

Light sources may also include one or more optical adjustment components. The term "optical adjustment" is used herein in its conventional sense to refer to any device that is capable of changing the spatial width of irradiation or some other characteristic of irradiation from one or more of the lasers, such as for example, irradiation direction, wavelength, beam width, beam intensity, focal point and pulse width. Optical adjustment protocols may be any convenient device which adjusts one or more characteristics of the laser, including but not limited to lenses, mirrors, filters, fiber optics, wavelength separators, pinholes, slits, collimating protocols and combinations thereof. In certain embodiments, systems of interest include one or more focusing lenses. The focusing lens, in one example may be a de-magnifying lens. In another example, the focusing lens is a magnifying lens. In other embodiments, systems of interest include one or more mirrors. In still other embodiments, systems of interest include fiber optics. In some embodiments, the beams of light from each laser are combined by a beam combiner, such as a dichroic mirror beam combiner. In these embodiments, the beam combiner combines the light beams from each laser and propagates the light to the beam shaping component.

In certain embodiments, light from each laser is propagated to the flow stream via a mirror component. In some instances, the mirror component may include a first mirror and a second mirror positioned to propagate light from the first mirror to the flow stream. In embodiments, the second mirror is positioned to propagate light from the first mirror at an angle that varies with respect to the first mirror, such as from 1° to 90°, such as from 5° to 85°, such as from 10° to 80°, such as from 15° to 75°, such as from 20° to 70°, such as from 25° to 65° and including from 30° to 60°. In certain instances, the second mirror is positioned to orthogonally propagate light from the first mirror. In other embodiments, the second mirror is positioned to propagate light from the first mirror at an angle that varies with respect to the laser, such as from 1° to 90°, such as from 5° to 85°, such as from 10° to 80°, such as from 15° to 75°, such as from 20° to 70°, such as from 25° to 65° and including from 30° to 60°. In certain instances, the second mirror is positioned to propagate light orthogonally with respect to the laser. In some embodiments, the second mirror is also a beam combiner configured to combine the beams of light from the two or more lasers. In these embodiments, the second mirror may be a dichroic mirror, which selectively passes wavelengths of light as desired.

Figure 3:
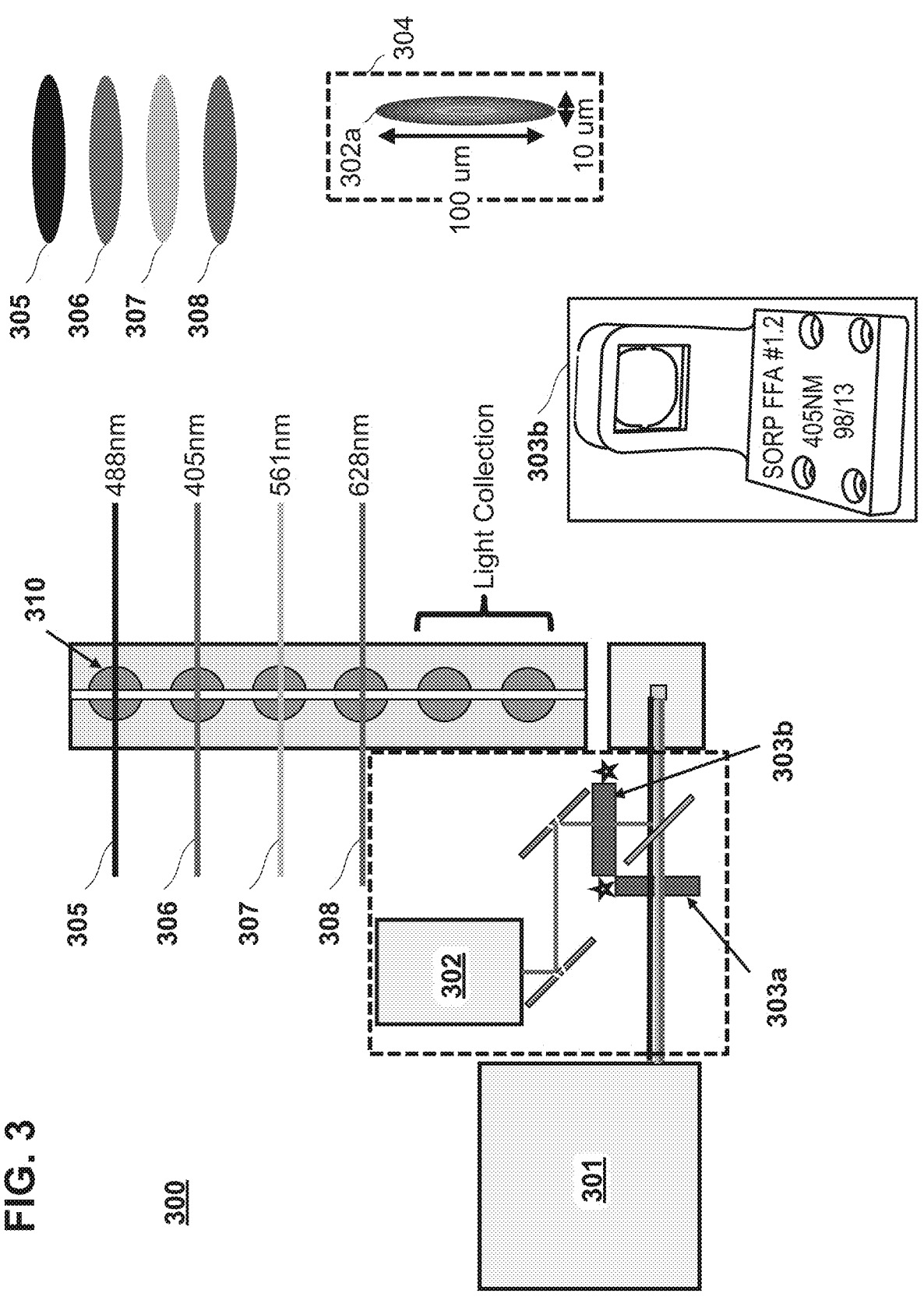
FIG. 3 depicts a light source for irradiating a composition having particles in a flow stream according to certain embodiments.

FIG. 3 depicts a light source for irradiating a composition having particles in a flow stream according to certain embodiments. Light source 300 includes laser modules 301 and 302. Laser module 301 includes a first laser 305 having a wavelength of 488 nm, a second laser 306 having a wavelength of 405 nm, a third laser 307 having a wavelength of 561 nm and a fourth laser 308 having a wavelength of 628 nm. Long wavelength (e.g., 980 nm) laser 302a is outputted from laser module 302. Laser 302a is configured to irradiate particles 310 in the flow stream with an elliptical beam spot (shown at 304) where the long axis of the elliptical beam spot is orthogonal to the horizontal axis of the flow stream. In some instances, this beam spot configuration provides for a Gaussian beam power density profile across a horizontal axis of the flow stream. Laser module 301 is in optical communication with a first optical adjustment component 303a which conveys light from lasers 305, 306, 307 and 308 to the flow stream. In some embodiments, the output laser beams from lasers 305, 306, 307 and 308 are configured such that the long axis of the elliptical beam spot is orthogonal to the longitudinal axis of the flow stream (i.e., orthogonal to the beam spot from laser 302a) Laser module 302 is in optical communication with a second optical adjustment component 303b which is configured to rotate the beam spots from laser 302a by 90° to generate the beam profile shown in 304 and provide for a Gaussian beam power density profile across a horizontal axis of the flow stream. An example of optical adjustment component 303b is shown in FIG. 3.

Systems of the present disclosure also include a light detection system having a photodetector for detecting light from the irradiated core stream. Photodetectors may be any convenient light detecting protocol, including but not limited to photosensors or photodetectors, such as active-pixel sensors (APSs), avalanche photodiodes (APDs), quadrant photodiodes, image sensors, charge-coupled devices (CODs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 cm$^2$ to 10 cm$^2$, such as from 0.05 cm$^2$ to 9 cm², such as from, such as from 0.1 cm² to 8 cm², such as from 0.5 cm² to 7 cm² and including from 1 cm² to 5 cm².

In some embodiments, light detection systems of interest include a plurality of photodetectors. In some instances, the light detection system includes a plurality of solid-state detectors such as photodiodes. In certain instances, the light detection system includes a photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm and a length that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm, where the surface area of each photodetector (e.g., photodiode) in the array ranges from 25 to μm² to 10000 μm², such as from 50 to μm² to 9000 μm², such as from 75 to μm² to 8000 μm², such as from 100 to μm² to 7000 μm², such as from 150 to μm² to 6000 μm² and including from 200 to μm² to 5000 μm².

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 mm² to 10000 mm², such as from 0.5 mm² to 5000 mm², such as from 1 mm² to 1000 mm², such as from 5 mm² to 500 mm², and including from 10 mm² to 100 mm².

Light may be measured by the photodetector at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths. In some embodiments, fluorescence from the sample is detected by the light detection system over one or more of the wavelength ranges of 200 nm-1200 nm. In some instances, methods include detecting fluorescence from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, methods include detecting fluorescence at one or more specific wavelengths. For example, the fluorescence may be detected at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof, depending on the number of different fluorescent light detectors in the subject light detection system.

Light may be measured continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval. Measurements of the light from across the flow stream may be taken one or more times during each discrete time interval, such as 2 or more times, such as 3 or more times, such as 5 or more times and including 10 or more times. In certain embodiments, the light from the flow stream is measured by the photodetector 2 or more times, with the data in certain instances being averaged.

Each photodetector may be positioned at any suitable distance from the flow stream so long as a usable light signal is detectable. For example, detectors in the subject systems may be positioned 1 mm or more from the flow stream, such as 5 mm or more, such as 10 mm or more, such as 15 mm or more, such as 25 mm or more, such as 50 mm or more, such as 100 mm or more, such as 150 mm or more, such as 250 mm or more and including 500 mm or more from the flow stream. The detectors may also be positioned at any angle from the flow stream. For example, the detectors may be angled with respect to the vertical axis of the flow stream at from 10° to 90°, such as from 15° to 85°, such as from 20° to 80°, such as from 25° to 75° and including from 30° to 60°. In some instances, the one or more detectors are positioned at 30° to 60° with respect to the vertical axis of the flow stream.

In embodiments, light detection systems are configured to detect forward scattered light, side scattered light, emitted light, transmitted light or a combination thereof. In certain embodiments, the light signals from the irradiated flow stream may be detected by one or more detectors configured as forward scatter detectors. In these embodiments, the forward scatter detectors are positioned on the opposite side of the flow stream from the light source and are positioned to collect and detect forward propagated (e.g., scattered) light. In some embodiments, light from the irradiated sample in the flow stream is detected in one or more fluorescent detector channels. In some embodiments light from the irradiated sample in the flow stream is detected in one or more scattered light detector channels.

In some embodiments, systems include an optical collection system for collecting and directing light from the flow stream to the light detection system. The optical collection system may be physically coupled to the light detection system, such as with an adhesive, co-molded together or integrated into the light detection system. In certain embodiments, the optical collection system and the light detection system are integrated into a single unit. In other embodiments, the optical collection system is coupled to the light detection system with a connector, such as with a hook and loop fasteners, magnets, latches, notches, countersinks, counter-bores, grooves, pins, tethers, hinges, Velcro, non-permanent adhesives or a combination thereof.

In other embodiments, the light detection system and the optical collection system are in optical communication, but are not physically in contact. For example, the optical collection system may be positioned 0.001 mm or more from the light detection system, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the light detection system.

In certain embodiments, the optical collection system includes fiber optics. For example, the optical collection system may be a fiber optics light relay bundle and light from the flow stream is conveyed through the fiber optics light relay bundle to the first set of linear variable optical filters of the light detection system. Any fiber optics light relay system may be employed to convey light, where in certain embodiments, suitable fiber optics light relay systems include, but are not limited to, fiber optics light relay systems such as those described in U.S. Pat. No. 6,809,804, the disclosure of which is herein incorporated by reference.

In other embodiments, the optical collection system is a free-space light relay system. The phrase "free-space light relay" is used herein in its conventional sense to refer to light propagation that employs a configuration of one or more optical components to direct light from the sample to the light detection system through free-space. In certain embodiments, the free-space light relay system includes a housing having a proximal end and a distal end, the proximal end being coupled to the light detection module. The free-space relay system may include any combination of different optical components, such as one or more of lenses, mirrors, slits, pinholes, wavelength separators, or a combination thereof. For example, in some embodiments, free-space light relay systems of interest include one or more focusing lens. In other embodiments, the subject free-space light relay systems include one or more mirrors. In yet other embodiments, the free-space light relay system includes a collimating lens. In certain embodiments, suitable free-space light relay systems for propagating light from the sample to the first set of linear variable optical filters of the light detection system include, but are not limited to, light relay systems such as those described in U.S. Pat. Nos. 7,643,142; 7,728,974 and 8,223,445, the disclosures of which is herein incorporated by reference.

In some embodiments, systems include a processor having memory operably coupled to the processor where the memory includes instructions stored thereon, which when executed by the processor, cause the processor to determine emission intensity of the irradiated particles of the composition and determine the position of the irradiated particles of the composition in the core stream of the flow stream based on the determined emission intensity.

As described above, in some embodiments the composition includes particles that are coupled to an irradiation power density-sensitive compound that emits light having an intensity that depends on irradiation power density of the light source incident on the particle. In some instances, the irradiated particles of the composition exhibit a change in emission intensity based on the intensity of irradiation by the light source incident on the particles. In certain embodiments, the irradiated particles of the composition have a spectral profile that changes in response to the power density of the light source. In some embodiments, the particles of the composition have 2 or more emission peaks in response to irradiation by the light source, such as 3 or more, such as 4 or more, such as 5 or more, such as 6 or more, such as 7 or more, such as 8 or more, such as 9 or more and including 10 or more emission peaks. In certain instances, one or more peaks of the spectral profile exhibits a change in intensity in response to the power density of the light source. In certain instances, the intensity of each emission peak depends on the irradiation power density of the light source. In some embodiments, the memory includes instructions for determining position information for a particle of the composition based on the emission intensity of one or more emission peaks. In some instances, the memory includes instructions for determining that the particle is propagated at or near the center of the core stream when the emission peak exhibits a high emission intensity and the particle is determined to be propagated at or near an edge of the core stream when the emission peak exhibits a low emission intensity. In some instances, the memory includes instructions for determining that the particle is propagated at or near the center of the core stream when the emission peak exhibits a low emission intensity and the particle is determined to be propagated at or near an edge of the core stream when the emission peak exhibits a high emission intensity.

In certain embodiments, the irradiated particles of the composition have a first emission peak having a first intensity at a first irradiation power density and a second intensity at a second irradiation power density and a second emission peak having the same intensity at the first irradiation power density and the second irradiation power density. In some instances, the memory includes instructions for determining position information for a particle of the composition based on the emission intensity of the first and second emission peaks. In one example, the memory includes instructions for determining that the particle is propagated at or near the center of the core stream when the first emission peak exhibits a high emission intensity and the particle is determined to be propagated at or near an edge of the core stream when the first emission peak exhibits a low emission intensity. In another example, the memory includes instructions for determining that the particle is propagated at or near the center of the core stream when the first emission peak exhibits a low emission intensity and the particle is determined to be propagated at or near an edge of the core stream when the first emission peak exhibits a high emission intensity.

In other instances, the memory includes instructions for determining the position of the particle based on the ratio of the intensity of the first emission peak and the intensity of the second emission peak. In some instances, the ratio of the intensity of the first emission peak and the intensity of the second emission peak ranges from 1:100 to 100:1, such as from 1:75 to 75:1, such as from 1:50 to 50:1, such as from 1:25 to 25:1, such as from 1:10 to 10:1, such as from 1:9 to 9:1, such as from 1:8 to 8:1, such as from 1:7 to 7:1, such as from 1:6 to 6:1, such as from 1:5 to 5:1 and including from 1:4 to 4:1. In certain embodiments, the memory includes instructions for determining that the particle is propagated at or near the center of the core stream when the ratio of the intensity of the first emission peak and the intensity of the second emission peak is from 0.7:1 to 1:0.7, such as from 0.8:1 to 1:0.8, such as from 0.9:1 to 1:0.9 and including from 0.95:1 to 1:0.95. In certain instances, the memory includes instructions for determining that the particle is propagated at or near the center of the core stream when the ratio of the intensity of the first emission peak and the intensity of the second emission peak is about 1:1 (i.e., the particle is propagated through the center of the core stream (or at the center of irradiation by the light source when the first emission peak and the second emission peak have about the same emission intensity). In some embodiments, the greater the ratio of the intensity of the first emission peak and the intensity of the second emission peak, the greater the distance from the center of irradiation (or center of the core stream when the light source and core stream are aligned) the particle is being propagated.

In some embodiments, the memory includes instructions for determining that particles of the composition are propagated through the flow stream at or near the center of the core stream. In some instances, the memory includes instructions for determining that particles of the composition are propagated through the flow stream at or near an edge of the core stream. In certain embodiments, the memory includes instructions for generating one or more particle population clusters based on the determined position of the particle in the core stream. In some instances, the memory includes instructions for classifying particles as being irradiated at or near the center of the core stream based on the determined spectral emission intensity profile. In other instances, the memory includes instructions for classifying particles as being irradiated at or near an edge of the core stream based on the determined spectral emission intensity profile. In some instances, the memory includes instructions for clustering together data signals from particles classified as being irradiated at or near the center of the core stream. In some instances, the memory includes instructions for clustering together data signals from particles classified as being irradiated at or near an edge of the core stream. In certain embodiments, the memory includes instructions for discarding data signals from particles of the composition classified as being irradiated at or near an edge of the core stream.

In certain embodiments, systems further include a flow cell configured to propagate compositions in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis.

The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may 1 μL/min or more, such as 2 μL/min or more, such as 3 μL/min or more, such as 5 μL/min or more, such as 10 μL/min or more, such as 15 μL/min or more, such as 25 μL/min or more, such as 50 μL/min or more and including 100 μL/min or more, where in some instances the rate of sample conveyed to the flow cell chamber by the sample injection port is 1 μL/sec or more, such as 2 μL/sec or more, such as 3 μL/sec or more, such as 51 μL/sec or more, such as 10 μL/sec or more, such as 15 μL/sec or more, such as 25 μL/sec or more, such as 50 μL/sec or more and including 100 μL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 µL/sec or more, such as 50 µL/sec or more, such as 75 µL/sec or more, such as 100 µL/sec or more, such as 250 µL/sec or more, such as 500 µL/sec or more, such as 750 µL/sec or more, such as 1000 µL/sec or more and including 2500 µL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross-sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 µL/min (microliter per minute) or more, such as 2 µL/min or more, such as 3 µL/min or more, such as 5 µL/min or more, such as 10 µL/min or more, such as 25 µL/min or more, such as 50 µL/min or more, such as 75 µL/min or more, such as 100 µL/min or more, such as 250 µL/min or more, such as 500 µL/min or more, such as 750 µL/min or more and including 1000 µL/min or more. For example, the system may include a pump that is configured to flow sample through the flow cell at a rate that ranges from 1 µL/min to 500 µL/min, such as from 1 µL/min to 250 µL/min, such as from 1 µL/min to 100 µL/min, such as from 2 µL/min to 90 µL/min, such as from 3 µL/min to 80 µL/min, such as from 4 µL/min to 70 µL/min, such as from 5 µL/min to 60 µL/min and including rom 10 µL/min to 50 µL/min. In certain embodiments, the flow rate of the flow stream is from 5 µL/min to 6 µL/min.

In certain embodiments, light detection systems having the plurality of photodetectors as described above are part of or positioned in a particle analyzer, such as a particle sorter. In certain embodiments, the subject systems are flow cytometric systems that includes the photodiode and amplifier component as part of a light detection system for detecting light emitted by a sample in a flow stream. Suitable flow cytometry systems may include, but are not limited to, those described in Ormerod (ed.), *Flow Cytometry: A Practical Approach,* Oxford Univ. Press (1997); Jaroszeski et al. (eds.), *Flow Cytometry Protocols,* Methods in Molecular Biology No. 91, Humana Press (1997); *Practical Flow Cytometry,* 3rd ed., Wiley-Liss (1995); Virgo, et al. (2012) *Ann Clin Biochem.* Jan; 49 (pt 1):17-28; Linden, et. al., *Semin Throm Hemost.* 2004 October; 30 (5):502-11; Alison, et al. *J Pathol,* 2010 December; 222 (4):335-344; and Herbig, et al. (2007) *Crit Rev Ther Drug Carrier Syst.* 24 (3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSR-Fortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017;

6,809,804; 6,372,506; 5,700,692; 5,643,796; 5,627,040; 5,620,842; 5,602,039; 4,987,086; 4,498,766; the disclosures of which are herein incorporated by reference in their entirety.

In some embodiments, the subject systems are particle sorting systems that are configured to sort particles with an enclosed particle sorting module, such as those described in U.S. Patent Publication No. 2017/0299493, the disclosure of which is incorporated herein by reference. In certain embodiments, particles (e.g, cells) of the sample are sorted using a sort decision module having a plurality of sort decision units, such as those described in U.S. Patent Publication No. 2020/0256781, the disclosure of which is incorporated herein by reference. In some embodiments, the subject systems include a particle sorting module having deflector plates, such as described in U.S. Patent Publication No. 2017/0299493, filed on Mar. 28, 2017, the disclosure of which is incorporated herein by reference.

In certain instances, flow cytometry systems of the invention are configured for imaging particles in a flow stream by fluorescence imaging using radiofrequency tagged emission (FIRE), such as those described in Diebold, et al. *Nature Photonics* Vol. 7 (10); 806-810 (2013) as well as described in U.S. Pat. Nos. 9,423,353; 9,784,661; 9,983,132; 10,006, 852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 4A:
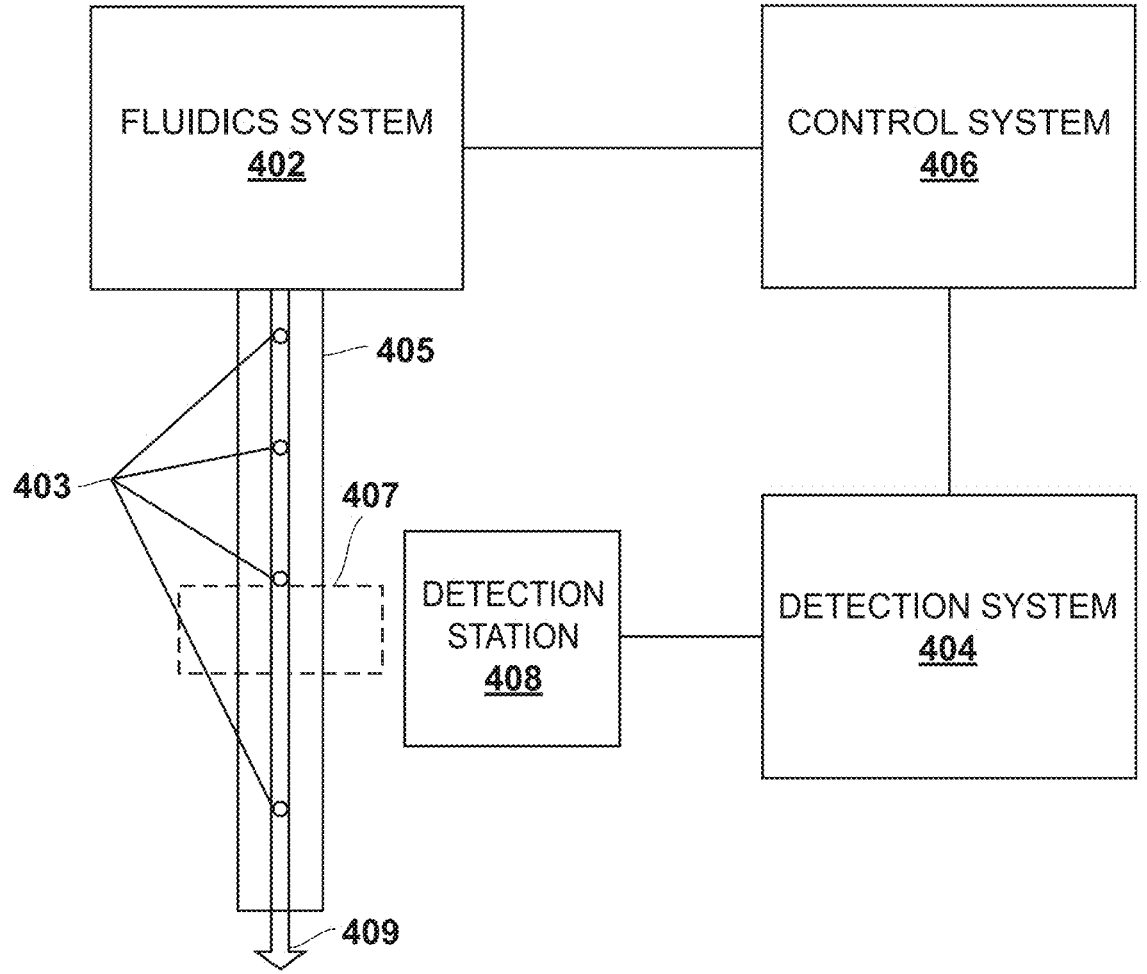
FIG. 4A depicts a functional block diagram of a particle analysis system according to certain embodiments.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first-time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first-time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
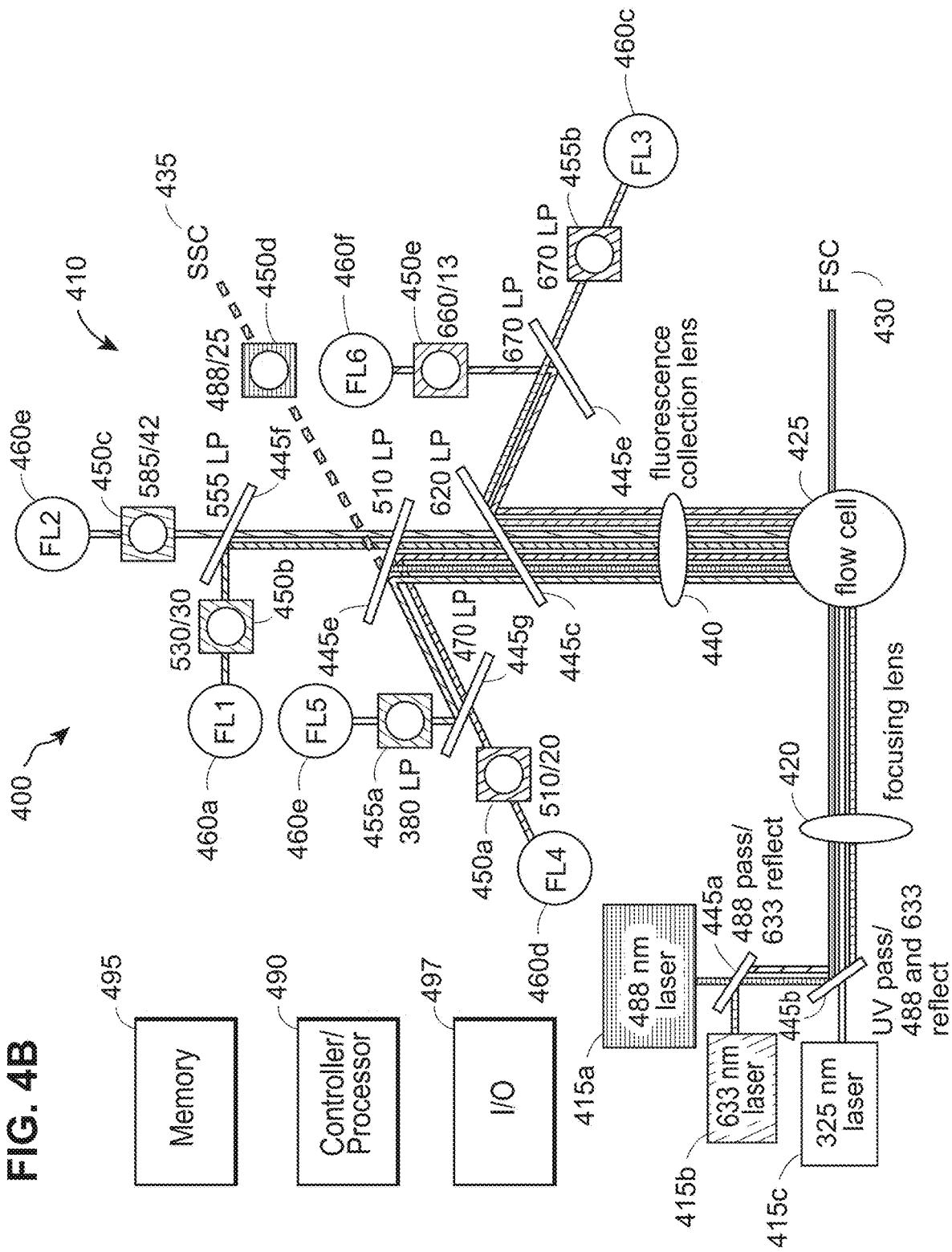
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-

455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
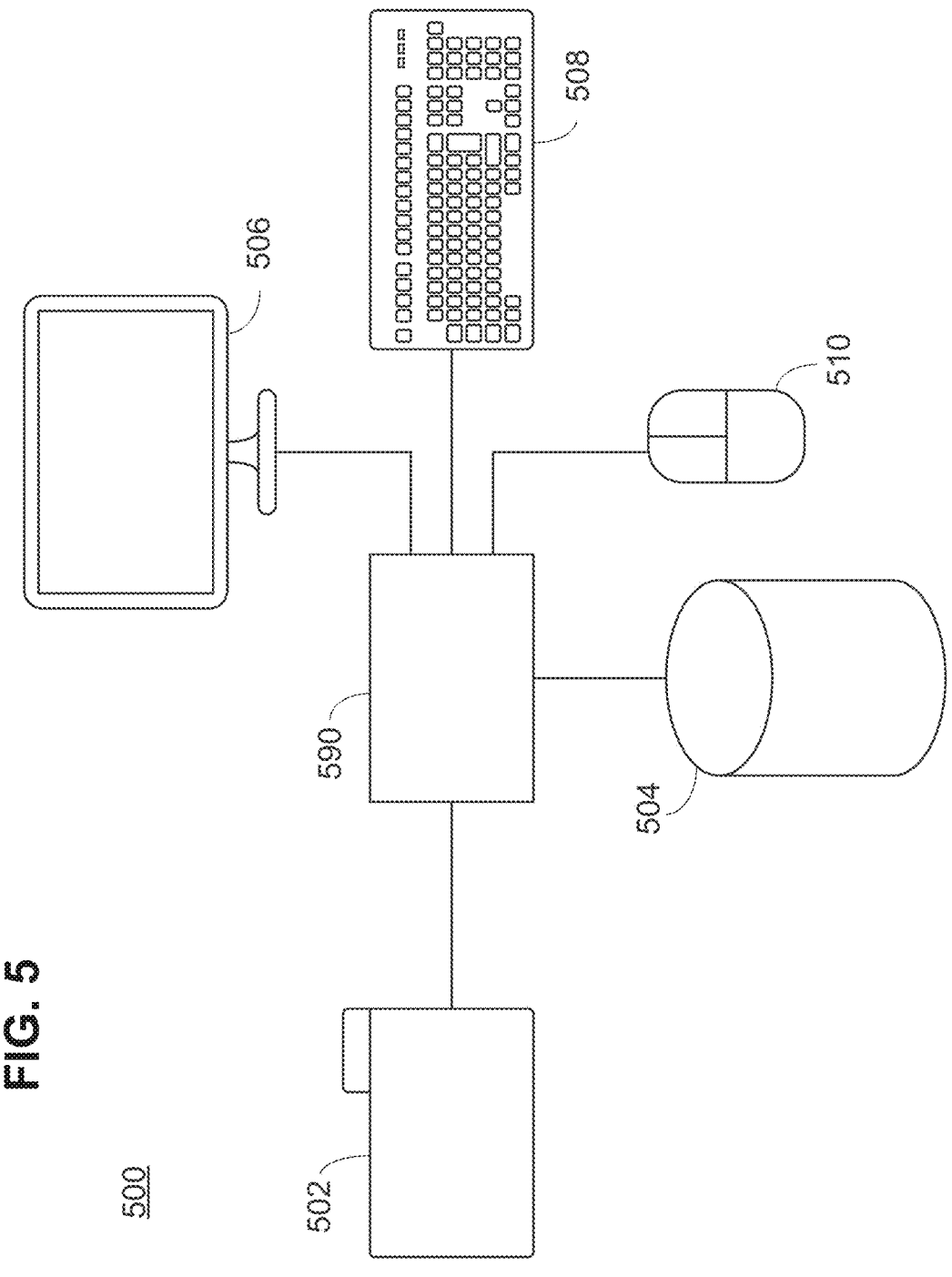
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer or sorting system 502 can be configured to acquire biological event data. For example, a flow cytometer can generate flow cytometric event data. The particle analyzer 502 can be configured to provide biological event data to the analytics controller 500. A data communication channel can be included between the particle analyzer or sorting system 502 and the analytics controller 500. The biological event data can be provided to the analytics controller 500 via the data communication channel.

The analytics controller 500 can be configured to receive biological event data from the particle analyzer or sorting system 502. The biological event data received from the particle analyzer or sorting system 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Figure 6A:
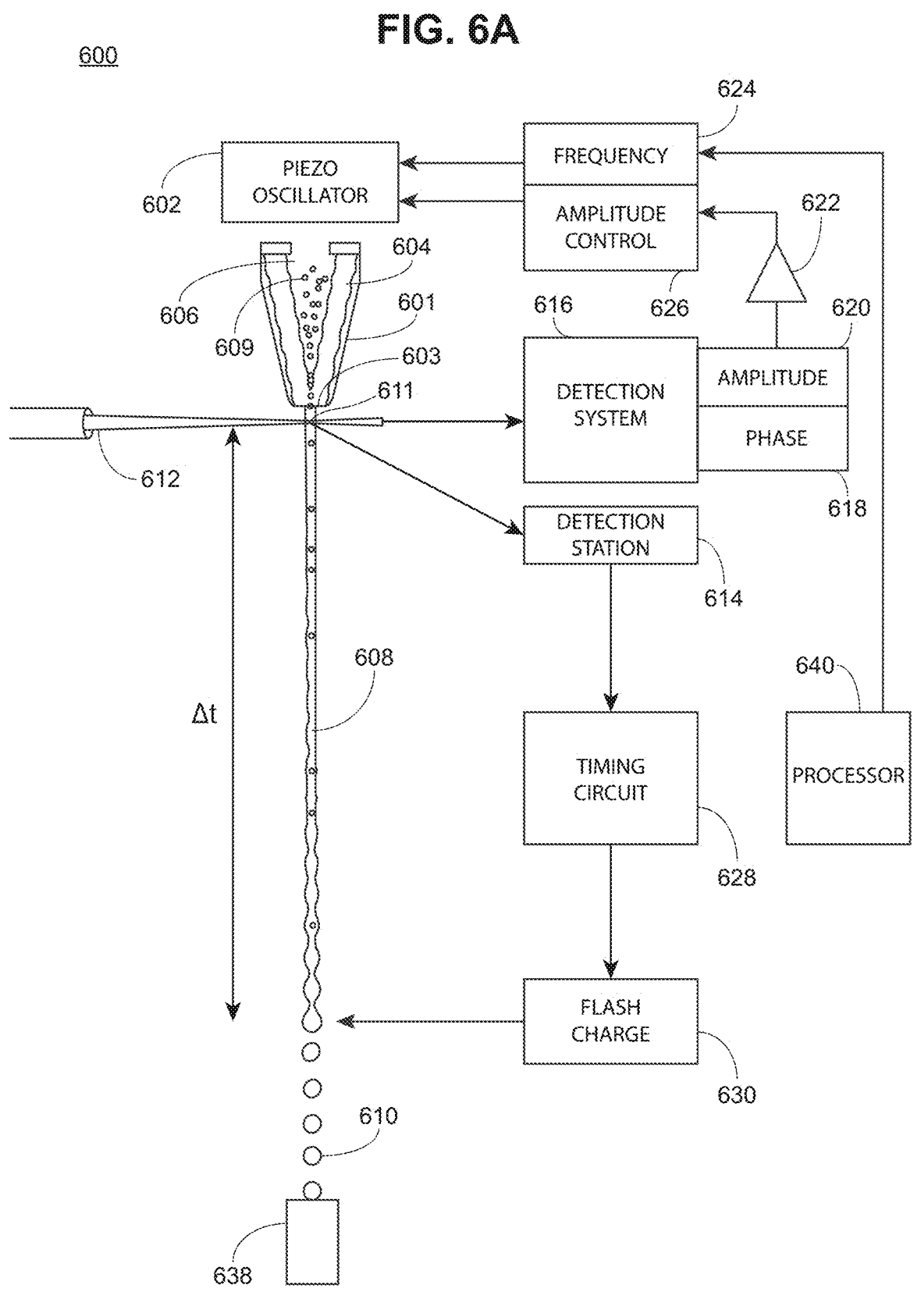

FIG. 6A is a schematic drawing of a particle sorter system 600 (e.g., the particle analyzer or sorting system 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydro-dynamically focuses a sample fluid 606 comprising particles 609 into a moving fluid column 608 (e.g., a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay (Δt), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g., a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, NJ).

Computer-Controlled Systems

Aspects of the present disclosure further include computer-controlled systems, where the systems further include one or more computers for complete automation or partial automation of the methods described herein. In some embodiments, systems include a computer having a computer readable storage medium with a computer program stored thereon, where the computer program when loaded on the computer includes instructions for determining position information for particles in a flow stream of a flow cytometer according to the subject methods described herein. In some embodiments, the computer program includes instructions for propagating a composition having particles (e.g., cells) through a flow stream comprising a core stream and a sheath flow stream, instructions for irradiating the particles of the composition with a light source, instructions for detecting light from the irradiated particles, instructions for determining emission intensity of the irradiated particles of the composition and instructions for determining the position of the irradiated particles in the core stream of the flow stream based on the on the detected light emission from the irradiated particles. In some embodiments, the composition is a biological composition and the particles of interest in the composition are cells.

In some embodiments, the computer program includes instructions for determining the position of the irradiated particles of the composition based on a difference between the emission intensity of the first emission peak and the second emission peak. In some instances, the computer program includes instructions for determining that the irradiated particles are propagated through the core stream at about the center of the irradiation position of the light source when the first emission peak and the second emission peak have about the same intensity. In some instances, the computer program includes instructions for determining that the irradiated particles propagated through the core stream at an edge of the irradiation position of the light source when the first emission peak and the second emission peak have different intensities. In some instances, the computer program includes instructions for determining that the irradiated particles are propagated through the core stream at about the center of the core stream when the first emission peak and the second emission peak have about the same intensity. In some instances, the computer program includes instructions for determining that the irradiated particles are propagated through the core stream at an edge of the core stream when the first emission peak and the second emission peak have different intensities.

In certain embodiments, the computer program includes instructions for generating one or more particle population clusters based on the determined position of the particle in the core stream. In certain instances, the computer program includes instructions for clustering particles determined to be propagated through the flow stream at or near the center of the core stream. In certain instances, the computer program includes instructions for clustering particles determined to be propagated through the flow stream at or near an edge of the core stream. In certain instances, the computer program includes instructions for discarding data signals generated in response to light from irradiated particles determined to be propagated through the flow stream at or near an edge of the core stream.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows, iOS, Oracle Solaris, Linux, IBM i, Unix, and others.

Figure 7:
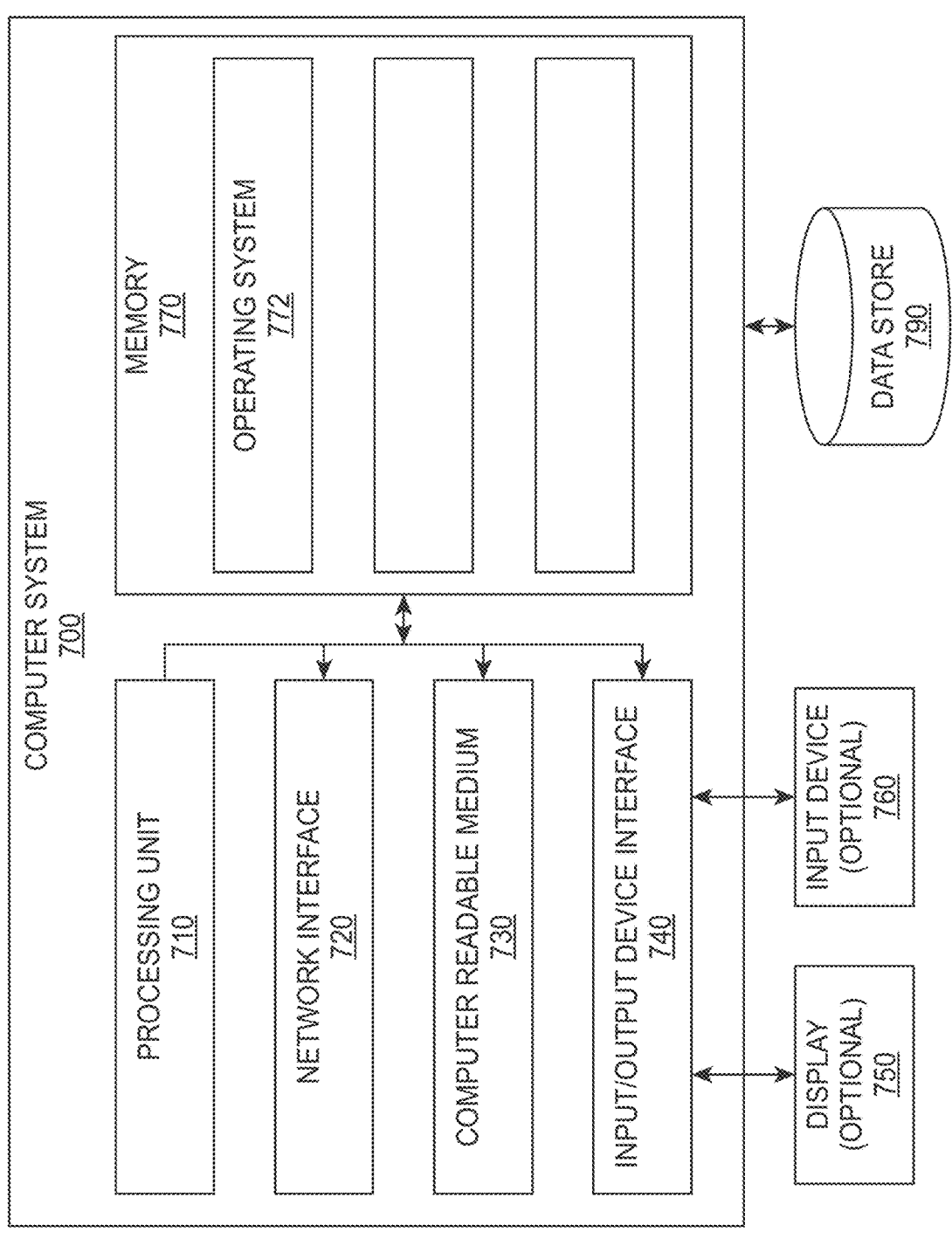
FIG. 7 depicts a block diagram of a computing system according to certain embodiments.

FIG. 7 depicts a general architecture of an example computing device 700 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Non-Transitory Computer-Readable Storage Medium

Aspects of the present disclosure further include non-transitory computer readable storage mediums having instructions for determining position information for particles in a flow stream of a flow cytometer according to the subject methods described herein. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Python, Java, Java Script, C, C#, C++, Go, R, Swift, PHP, as well as any many others.

In some embodiments, particles irradiated in the composition are stably associated with an irradiation power density-sensitive compound that emits light having an intensity that depends on irradiation power density of the light source incident on the particle. In some embodiments, the irradiated particles are configured to have a spectral emission intensity profile that changes in response to the power density of the light source, such as where the particles of the composition are configured to have 2 or more emission peaks in response to irradiation by the light source. In some instances, the intensity of each emission peak depends on the irradiation power density of the light source. In certain instances, one or more of the emission peaks has a first intensity at a first irradiation power density of the light source and a second intensity at a second irradiation power density of the light source. In certain embodiments, the particles of the composition have a first emission peak having a first intensity at a first irradiation power density and a second intensity at a second irradiation power density and a second emission peak having the same intensity at the first irradiation power density and the second irradiation power density.

In some embodiments, the non-transitory computer readable storage medium includes algorithm for determining the position of the irradiated particles of the composition based on a difference between the emission intensity of the first emission peak and the second emission peak. In some instances, the non-transitory computer readable storage medium includes algorithm for determining that the irradiated particles are propagated through the core stream at about the center of the irradiation position of the light source when the first emission peak and the second emission peak have about the same intensity. In some instances, the non-transitory computer readable storage medium includes algorithm for determining that the irradiated particles propagated through the core stream at an edge of the irradiation position of the light source when the first emission peak and the second emission peak have different intensities. In some instances, the non-transitory computer readable storage medium includes algorithm for determining that the irradiated particles are propagated through the core stream at about the center of the core stream when the first emission peak and the second emission peak have about the same intensity. In some instances, the non-transitory computer readable storage medium includes algorithm for determining that the irradiated particles are propagated through the core stream at an edge of the core stream when the first emission peak and the second emission peak have different intensities.

In certain embodiments, the non-transitory computer readable storage medium includes algorithm for generating one or more particle population clusters based on the determined position of the particle in the core stream. In certain instances, the non-transitory computer readable storage medium includes algorithm for clustering particles determined to be propagated through the flow stream at or near the center of the core stream. In certain instances, the non-transitory computer readable storage medium includes algorithm for clustering particles determined to be propagated through the flow stream at or near an edge of the core stream. In certain instances, the non-transitory computer readable storage medium includes algorithm for discarding data signals generated in response to light from irradiated particles determined to be propagated through the flow stream at or near an edge of the core stream.

The non-transitory computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as those mentioned above, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Aspects of the present disclosure further include kits, where kits in some embodiments include one or more compositions for determining particle position in a core stream of a stream as described herein. In some embodiments, kits include a composition having particles stably associated with an irradiation power density-sensitive compound that emits light having an intensity that depends on irradiation power density of light incident on the particle. As described above, in some instances the irradiation power density-sensitive compound is covalently bonded to the particles in the composition, such as through a cleavable or non-cleavable linker. In other instances, the irradiation power density-sensitive compound is associated with the particle through a specific binding member, such as an antibody.

In certain embodiments, kits include one or more compositions for stably associating particles of a sample composition (e.g., a biological composition where particles of interest are cells) with an irradiation power density-sensitive compound. In some instances, the irradiation power density-sensitive compound is conjugated to a specific binding member. For example, in compositions of interest the irradiation power density-sensitive compound may be covalently bonded to a proteinaceous specific binding member such as an antibody. In other embodiments, the compositions may be formulated to covalently bond the irradiation power density-sensitive compound to the particles in the composition, such as through a cleavable or non-cleavable linker.

In some instances, the particles stably associated with the irradiation power density-sensitive compound have 2 or more emission peaks in response to irradiation by the light source. In certain embodiments, one or more of the emission peaks has a first intensity at a first irradiation power density of the light source and a second intensity at a second irradiation power density of the light source. In certain instances, the particles of the composition have a first emission peak having a first intensity at a first irradiation power density and a second intensity at a second irradiation power density and a second emission peak having the same intensity at the first irradiation power density and the second irradiation power density. In some embodiments, the irradiation power density-sensitive compound are upconverting nanoparticles (UCNPs). In some instances, the upconverting nanoparticles are lanthanide-doped particles. In certain instances, the upconverting nanoparticles are europium-doped or thulium-doped nanoparticles, such as NaYF4:Yb, Er particles or NaYF4:YbTm nanoparticles.

In some embodiments, kits further include an optical adjustment component configured to orthogonally rotate a Gaussian beam profile. In certain embodiments, kits include a plurality of photodetectors and programming for the subject systems, such as in the form of a computer readable medium (e.g., flash drive, USB storage, compact disk, DVD, Blu-ray disk, etc.) or instructions for downloading the programming from an internet web protocol or cloud server. Kits may also include an optical adjustment component, such as lenses, mirrors, filters, fiber optics, wavelength separators, pinholes, slits, collimating protocols and combinations thereof.

Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject methods, systems and computer systems find use in a variety of applications where it is desirable to optimize processors and light detection systems of a flow cytometer. The subject methods and systems also find use for light detection systems having a plurality of photodetectors that are used to analyze and sort particle components in a sample in a fluid medium, such as a biological sample. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject methods and systems provide fully automated protocols so that adjustments to a flow cytometer during use require little, if any human input.

Notwithstanding the appended claims, the disclosure is also defined by the following clauses:

1. A method for determining particle position in a core stream of a flow stream propagating through a flow cell, the method comprising:

irradiating with a light source a composition comprising particles propagating through a flow stream comprising a core stream and a sheath flow stream, wherein the particles are stably associated with an irradiation power density-sensitive compound that emits light having an intensity that depends on irradiation power density of the light source incident on the particle;

detecting light emission from the irradiated particles; and determining position of the particles in the core stream based on the detected light emission from the irradiated particles.

2. The method according to clause 1, wherein the composition is a biological composition and the particles are cells.

3. The method according to any one of clauses 1-2, wherein the irradiation power density-sensitive compound is covalently bonded to the particles in the composition.

4. The method according to any one of clauses 1-3, wherein the irradiation power density-sensitive compound is covalently bonded to the particles in the composition through a linker.

5. The method according to clause 4, wherein the linker is a cleavable linker.

6. The method according to clause 4, wherein the linker is a non-cleavable linker.

7. The method according to any one of clauses 1-2, wherein the irradiation power density-sensitive compound is associated with the particle through a specific binding member.

8. The method according to clause 7, wherein the specific binding member is an antibody.

9. The method according to any one of clauses 1-8, wherein the irradiation power density-sensitive compound comprises an upconverting nanoparticle (UCNP).

10. The method according to clause 9, wherein the upconverting nanoparticle comprises a lanthanide-doped nanoparticle.

11. The method according to clause 9, wherein the upconverting nanoparticle comprises a europium-doped or thulium-doped nanoparticle.

12. The method according to clause 11, wherein the upconverting nanoparticle comprises a NaYF4:Yb,Er nanoparticle or a NaYF4:YbTm nanoparticle.

13. The method according to any one of clauses 1-12, wherein the irradiated particles in the composition are configured to have a spectral emission intensity profile that changes in response to the power density of the light source.

14. The method according to any one of clauses 1-13, wherein the irradiated particles in the composition are configured to have 2 or more emission peaks in response to irradiation by the light source.

15. The method according to clause 14, wherein the intensity of each emission peak depends on the irradiation power density of the light source.

16. The method according to any one of clauses 14-15, wherein one or more of the emission peaks has a first intensity at a first irradiation power density of the light source; and a second intensity at a second irradiation power density of the light source.

17. The method according to clause 16, wherein the irradiated particles have:

a first emission peak having a first intensity at a first irradiation power density and a second intensity at a second irradiation power density; and a second emission peak having the same intensity at the first irradiation power density and the second irradiation power density.

18. The method according to any one of clauses 1-17, wherein the light source has a Gaussian beam power density profile across a horizontal axis of the flow stream.

19. The method according to clause 18, wherein the light source comprises a laser.

20. The method according to any one of clauses 18-19, wherein the flow stream is irradiated with an elliptical beam spot having a long axis and a short axis.

21. The method according to clause 20, wherein the flow stream is irradiated such that the long axis of the beam spot is orthogonal to the horizontal axis of the flow stream.

22. The method according to any one of clauses 13-21, wherein the position of the irradiated particles in the core stream is determined based on the spectral emission intensity profile.

23. The method according to any one of clauses 13-22, wherein the method comprises determining the position of the particles of the composition based on a difference between the emission intensity of the first emission peak and the second emission peak.

24. The method according to clause 23, wherein the method comprises determining that the particles of the composition are propagated through the flow stream at about the center of the core stream when the first emission peak and second emission peak have the same intensity.

25. The method according to clause 23, wherein the method comprises determining that the particles of the composition are propagated through the flow stream at or near an edge of the core stream when the first emission peak and second emission peak have different intensities.

26. The method according to any one of clauses 22-25, wherein the method comprises generating one or more particle population clusters based on the determined position of the particle in the core stream.

27. The method according to clause 26, wherein the method comprises clustering particles determined to be propagated through the flow stream at or near the center of the core stream.

28. The method according to any one of clauses 26-27, wherein the method comprises clustering particles determined to be propagated through the flow stream at or near an edge of the core stream.

29. The method according to clause 28, wherein the method comprises discarding data signals generated in response to light from irradiated particles determined to be propagated through the flow stream at or near an edge of the core stream.

30. A system comprising:

a flow cell configured to propagate a composition comprising particles in a flow stream comprising a core stream and a sheath flow stream;

a light source for irradiating the particles of the composition; a light detection system for detecting light from the irradiated particles, wherein the particles are stably associated with an irradiation power density-sensitive compound that emits light having an intensity that depends on irradiation power density of the light source incident on the particle; and a processor comprising memory operably coupled to the processor wherein the memory comprises instructions stored thereon, which when executed by the processor, cause the processor to determine a position of the particles in the flow stream based on the detected light emission from the irradiated particles.

31. The system according to clause 30, wherein the composition is a biological composition and the particles are cells.

32. The system according to any one of clauses 30-31, wherein the irradiation power density-sensitive compound is covalently bonded to the particles in the composition.

33. The system according to any one of clauses 30-32, wherein the irradiation power density-sensitive compound is covalently bonded to the particles in the composition through a linker.

34. The system according to clause 33, wherein the linker is a cleavable linker.

35. The system according to clause 33, wherein the linker is a non-cleavable linker.

36. The system according to any one of clauses 30-31, wherein the irradiation power density-sensitive compound is associated with the particle through a specific binding member.

37. The method according to clause 36, wherein the specific binding member is an antibody.

38. The system according to any one of clauses 30-37, wherein the irradiation power density-sensitive compound comprises an upconverting nanoparticle (UCNP).

39. The system according to clause 38, wherein the upconverting nanoparticle comprises a lanthanide-doped nanoparticle.

40. The system according to clause 38, wherein the upconverting nanoparticle comprises a europium-doped or thulium-doped nanoparticle.

41. The system according to clause 40, wherein the upconverting nanoparticle comprises a NaYF4:Yb,Er nanoparticle or a NaYF4:YbTm nanoparticle.

42. The system according to any one of clauses 30-41, wherein the light source comprises a laser.

43. The system according to clause 42, wherein the laser has Gaussian beam power density profile across a horizontal axis of the flow stream.

44. The system according to any one of clauses 42-43, wherein the laser comprises an elliptical beam spot having a long axis and a short axis.

45. The system according to clause 44, wherein the laser is configured to irradiate the core stream with the elliptical beam spot such that the long axis of the beam spot is orthogonal to the horizontal axis of the flow stream.

46. The system according to clause 45, wherein light source comprises an optical adjustment component configured to propagate light from the laser such that the long axis of the beam spot is orthogonal to the horizontal axis of the flow stream.

47. The system according to clause 46, wherein the optical adjustment component is configured to rotate the beam spot by 90°.

48. The system according to clause 47, wherein the optical adjustment component comprises one or more lenses.

49. The system according to any one of clauses 42-48, wherein the light source comprises a plurality of lasers.

50. The system according to clause 49, wherein the light source comprises:

at least one laser having an elliptical beam spot having a long axis and a short axis that is configured to irradiate the flow stream such that the long axis of the beam spot is orthogonal to the longitudinal axis of the flow stream; and a laser having an elliptical beam spot having a long axis and a short axis that is configured to irradiate the flow stream such that the long axis of the beam spot is orthogonal to the horizontal axis of the flow stream.

51. The system according to any one of clauses 30-50, wherein the irradiated particles in the composition are configured to have a spectral emission intensity profile that changes in response to the power density of the light source.

52. The system according to clause 51, wherein the irradiated particles in the composition are configured to have 2 or more emission peaks in response to irradiation by the light source.

53. The system according to clause 52, wherein the intensity of each emission peak depends on the irradiation power density of the light source.

54. The system according to any one of clauses 51-53, wherein one or more of the emission peaks has a first intensity at a first irradiation power density of the light source; and a second intensity at a second irradiation power density of the light source.

55. The system according to clause 54, wherein the irradiated particles have:

a first emission peak having a first intensity at a first irradiation power density and a second intensity at a second irradiation power density; and a second emission peak having the same intensity at the first irradiation power density and the second irradiation power density.

56. The system according to any one of clauses 51-55, wherein the memory comprises instructions stored thereon which when executed by the processor cause the processor to determine the position of the irradiated particles in the core stream is based on the spectral emission intensity profile.

57. The system according to clause 56, wherein the memory comprises instructions stored thereon which when executed by the processor cause the processor to determine the position of the particles of the composition based on a difference between the emission intensity of the first emission peak and the second emission peak.

58. The system according to clause 57, wherein the memory comprises instructions stored thereon which when executed by the processor cause the processor to determine that the particles of the composition are propagated through the flow stream at about the center of the core stream when the first emission peak and second emission peak have the same intensity.

59. The system according to clause 57, wherein the memory comprises instructions stored thereon which when executed by the processor cause the processor to determine that the particles of the composition are propagated through the flow stream at or near an edge of the core stream when the first emission peak and second emission peak have different intensities.

60. The system according to any one of clauses 57-59, wherein the memory comprises instructions stored thereon which when executed by the processor cause the processor to generate one or more particle population clusters based on the determined position of the particle in the core stream.

61. The system according to clause 60, wherein the memory comprises instructions stored thereon which when executed by the processor cause the processor to cluster particles determined to be propagated through the flow stream at or near the center of the core stream.

62. The system according to clause 60, wherein the memory comprises instructions stored thereon which when executed by the processor cause the processor to cluster particles determined to be propagated through the flow stream at or near an edge of the core stream.

63. The system according to clause 62, wherein the memory comprises instructions stored thereon which when executed by the processor cause the processor to discard data signals generated in response to light from irradiated particles determined to be propagated through the flow stream at or near an edge of the core stream.

64. A non-transitory computer readable storage medium comprising instructions stored thereon for determining particle position in a core stream of a flow stream propagating through a flow cell, the instructions comprising:

algorithm for irradiating with a light source a composition comprising particles propagating through a flow stream comprising a core stream and a sheath flow stream, wherein the particles are stably associated with an irradiation power density-sensitive compound that emits light having an intensity that depends on irradiation power density of the light source incident on the particle;

algorithm for detecting light from the irradiated particles; and algorithm for determining position of the particles in the core stream based on the detected light emission from the irradiated particles.

65. The non-transitory computer readable storage medium according to clause 64, wherein the irradiated particles in the composition are configured to have a spectral emission intensity profile that changes in response to the power density of the light source.

66. The non-transitory computer readable storage medium according to any one of clauses 64-65, wherein the irradiated particles in the composition are configured to have 2 or more emission peaks in response to irradiation by the light source.

67. The non-transitory computer readable storage medium according to clause 65, wherein the intensity of each emission peak depends on the irradiation power density of the light source.

68. The non-transitory computer readable storage medium according to any one of clauses 66-67, wherein one or more of the emission peaks has a first intensity at a first irradiation power density of the light source; and a second intensity at a second irradiation power density of the light source.

69. The non-transitory computer readable storage medium according to clause 68, wherein the irradiated particles have:

a first emission peak having a first intensity at a first irradiation power density and a second intensity at a second irradiation power density; and a second emission peak having the same intensity at the first irradiation power density and the second irradiation power density.

70. The non-transitory computer readable storage medium according to any one of clauses 65-69, wherein the non-transitory computer readable storage medium comprises algorithm for determining the position of the irradiated particles in the core stream based on the spectral emission intensity profile.

71. The non-transitory computer readable storage medium according to any one of clauses 65-70, wherein the non-transitory computer readable storage medium comprises algorithm for determining the position of the particles of the composition based on a difference between the emission intensity of the first emission peak and the second emission peak.

72. The non-transitory computer readable storage medium according to clause 71, wherein the non-transitory computer readable storage medium comprises algorithm for determining that the particles of the composition are propagated through the flow stream at about the center of the core stream when the first emission peak and second emission peak have the same intensity.

73. The non-transitory computer readable storage medium according to clause 71, wherein the non-transitory computer readable storage medium comprises algorithm for determining that the particles of the composition are propagated through the flow stream at or near an edge of the core stream when the first emission peak and second emission peak have different intensities.

74. The non-transitory computer readable storage medium according to any one of clauses 71-73, wherein the non-transitory computer readable storage medium comprises algorithm for generating one or more particle population clusters based on the determined position of the particle in the core stream.

75. The non-transitory computer readable storage medium according to clause 74, wherein the non-transitory computer readable storage medium comprises algorithm for clustering particles determined to be propagated through the flow stream at or near the center of the core stream.

76. The non-transitory computer readable storage medium according to any one of clauses 74-75, wherein the non-transitory computer readable storage medium comprises algorithm for clustering particles determined to be propagated through the flow stream at or near an edge of the core stream.

77. The non-transitory computer readable storage medium according to clause 76, wherein the non-transitory computer readable storage medium comprises algorithm for discarding data signals generated in response to light from irradiated particles determined to be propagated through the flow stream at or near an edge of the core stream.

78. The non-transitory computer readable storage medium according to any one of clauses 64-77, wherein the composition is a biological composition and the particles are cells.

79. The non-transitory computer readable storage medium according to any one of clauses 64-78, wherein the irradiation power density-sensitive compound is covalently bonded to the particles in the composition.

80. The non-transitory computer readable storage medium according to any one of clauses 64-79, wherein the irradiation power density-sensitive compound is covalently bonded to the particles in the composition through a linker.

81. The non-transitory computer readable storage medium according to clause 80, wherein the linker is a cleavable linker.

82. The non-transitory computer readable storage medium according to clause 80, wherein the linker is a non-cleavable linker.

83. The non-transitory computer readable storage medium according to any one of clauses 64-78, wherein the irradiation power density-sensitive compound is associated with the particle through a specific binding member.

84. The non-transitory computer readable storage medium according to clause 83, wherein the specific binding member is an antibody.

85. The non-transitory computer readable storage medium according to any one of clauses 64-84, wherein the irradiation power density-sensitive compound comprises an upconverting nanoparticle (UCNP).

86. The non-transitory computer readable storage medium according to clause 85, wherein the upconverting nanoparticle comprises a lanthanide-doped nanoparticle.

87. The non-transitory computer readable storage medium according to clause 85, wherein the upconverting nanoparticle comprises a europium-doped or thulium-doped nanoparticle.

88. The non-transitory computer readable storage medium according to clause 87, wherein the upconverting nanoparticle comprises a NaYF4:Yb,Er nanoparticle or a NaYF4:YbTm nanoparticle.

89. A kit for determining particle position in a core stream of a flow stream propagating through a flow cell of a flow cytometer, the kit comprising a composition comprising particles stably associated with an irradiation power density-sensitive compound that emits light having an intensity that depends on irradiation power density of light incident on the particle.

90. The kit according to clause 89, wherein the irradiation power density-sensitive compound is covalently bonded to the particles in the composition.

91. The kit according to any one of clauses 89-90, wherein the irradiation power density-sensitive compound is covalently bonded to the particles in the composition through a linker.

92. The kit according to clause 91, wherein the linker is a cleavable linker.

93. The kit according to clause 91, wherein the linker is a non-cleavable linker.

94. The kit according to clause 89, wherein the irradiation power density-sensitive compound is associated with the particle through a specific binding member.

95. The kit according to clause 94, wherein the specific binding member is an antibody.

96. The kit according to any one of clauses 89-95, wherein the irradiation power density-sensitive compound comprises an upconverting nanoparticle (UCNP).

97. The kit according to clause 96, wherein the upconverting nanoparticle comprises a lanthanide-doped nanoparticle.

98. The kit according to clause 97, wherein the upconverting nanoparticle comprises a europium-doped or thulium-doped nanoparticle.

99. The kit according to clause 97, wherein the upconverting nanoparticle comprises a NaYF4:Yb,Er nanoparticle or a NaYF4:YbTm nanoparticle.

100. The kit according to any one of clauses 89-99, wherein the irradiation power density-sensitive compound exhibits 2 or more emission peaks when irradiated by a light source.

101. The kit according to clause 100, wherein the irradiation power density-sensitive compound exhibits a spectral emission intensity profile that changes in response to the power density of the light source.

102. The kit according to any one of clauses 100-101, wherein one or more of the emission peaks has a first intensity at a first irradiation power density of the light source; and a second intensity at a second irradiation power density of the light source.

103. The kit according to clause 102, wherein the particles have:
    a first emission peak having a first intensity at a first irradiation power density and a second intensity at a second irradiation power density; and
    a second emission peak having the same intensity at the first irradiation power density and the second irradiation power density.

104. The kit according to any one of clauses 89-103, wherein the kit further comprises an optical adjustment component configured to orthogonally rotate a beam of light.

105. The kit according to clause 104, wherein the optical adjustment component comprises one or more lenses.

106. A kit for determining particle position in a core stream of a flow stream propagating through a flow cell of a flow cytometer, the kit comprising a composition comprising a compound for stably associating with particles in a sample composition, wherein the compound is an irradiation power density-sensitive compound that emits light having an intensity that depends on irradiation power density of light incident on the particle.

107. The kit according to clause 106, wherein the sample composition is a biological composition and the particles are cells.

108. The kit according to any one of clauses 106-107, wherein the irradiation power density-sensitive compound is conjugated to a specific binding member.

109. The kit according to clause 108, wherein the irradiation power density-sensitive compound is covalently bonded to a proteinaceous binding member.

110. The kit according to clause 109, wherein the irradiation power density-sensitive compound is covalently bonded to an antibody.

111. The kit according to clause 89, wherein the composition is formulated to covalently bond the irradiation power density-sensitive compound to the particles in the sample composition.

112. The kit according to clause 111, wherein the composition is formulated to covalently bond the irradiation power density-sensitive compound to the particles in the sample composition through a linker.

113. The kit according to clause 112, wherein the linker is a cleavable linker.

114. The kit according to clause 112, wherein the linker is a non-cleavable linker.

115. The kit according to any one of clauses 106-114, wherein the irradiation power density-sensitive compound comprises an upconverting nanoparticle (UCNP).

116. The kit according to clause 115, wherein the upconverting nanoparticle comprises a lanthanide-doped nanoparticle.

117. The kit according to clause 115, wherein the upconverting nanoparticle comprises a europium-doped or thulium-doped nanoparticle.

118. The kit according to clause 109, wherein the upconverting nanoparticle comprises a NaYF4:Yb,Er nanoparticle or a NaYF4:YbTm nanoparticle.

119. The kit according to any one of clauses 106-118, wherein the irradiation power density-sensitive compound exhibits 2 or more emission peaks when irradiated by a light source.

120. The kit according to clause 119, wherein the irradiation power density-sensitive compound exhibits a spectral emission intensity profile that changes in response to the power density of the light source.

121. The kit according to any one of clauses 119-120, wherein one or more of the emission peaks has a first intensity at a first irradiation power density of the light source; and a second intensity at a second irradiation power density of the light source.

122. The kit according to clause 121, wherein the particles have:
   a first emission peak having a first intensity at a first irradiation power density and a second intensity at a second irradiation power density; and
   a second emission peak having the same intensity at the first irradiation power density and the second irradiation power density.

123. The kit according to any one of clauses 106-122, wherein the kit further comprises an optical adjustment component configured to orthogonally rotate a beam of light.

124. The kit according to any one of clauses 106-122, wherein the kit further includes one or more fluorophores for labelling the particles of the sample composition.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112(f) or 35 U.S.C. § 112(6) is not invoked.

What is claimed is:

1. A method for determining particle position in a core stream of a flow stream propagating through a flow cell, the method comprising:
   irradiating with a light source a composition comprising particles propagating through a flow stream comprising a core stream and a sheath flow stream, wherein the particles are bonded by a bond having a dissociation constant of $10^{-6}$ M or less to an irradiation power density-sensitive compound that comprises an upconverting nanoparticle (UCNP) and emits light having an intensity that depends on irradiation power density of the light source incident on the particle;
   detecting light emission from the irradiated particles; and
   determining position of the particles in the core stream based on the detected light emission from the irradiated particles.

2. The method according to claim 1, wherein the composition is a biological composition and the particles are cells.

3. The method according to claim 1, wherein the irradiation power density-sensitive compound is covalently bonded to the particles in the composition.

4. The method according to claim 1, wherein the irradiation power density-sensitive compound is covalently bonded to the particles in the composition through a linker.

5. The method according to claim 1, wherein the irradiation power density-sensitive compound is associated with the particle through a specific binding member.

6. The method according to claim 5, wherein the specific binding member is an antibody.

7. The method according to claim 1, wherein the irradiated particles in the composition are configured to have a spectral emission intensity profile that changes in response to the power density of the light source.

8. The method according to claim 1, wherein the irradiated particles in the composition are configured to have 2 or more emission peaks in response to irradiation by the light source.

9. The method according to claim 8, wherein the intensity of each emission peak depends on the irradiation power density of the light source.

10. The method according to claim 8, wherein one or more of the emission peaks has a first intensity at a first irradiation power density of the light source; and a second intensity at a second irradiation power density of the light source.

11. The method according to claim 10, wherein the irradiated particles have:
   a first emission peak having a first intensity at a first irradiation power density and a second intensity at a second irradiation power density; and
   a second emission peak having the same intensity at the first irradiation power density and the second irradiation power density.

12. The method according to claim 1, wherein the light source has a Gaussian beam power density profile across a horizontal axis of the flow stream.

13. The method according to claim 12, wherein the light source comprises a laser.

14. The method according to claim 12, wherein the flow stream is irradiated with an elliptical beam spot having a long axis and a short axis.

15. The method according to claim 7, wherein the position of the irradiated particles in the core stream is determined based on the spectral emission intensity profile.

16. The method according to claim 7, wherein the method comprises determining the position of the particles of the composition based on a difference between the emission intensity of the first emission peak and the second emission peak.

17. The method according to claim 16, wherein the method comprises determining that the particles of the composition are propagated through the flow stream at about the center of the core stream when the first emission peak and second emission peak have the same intensity.

18. The method according to claim 16, wherein the method comprises determining that the particles of the composition are propagated through the flow stream at or near an edge of the core stream when the first emission peak and second emission peak have different intensities.

19. A system comprising:

a flow cell configured to propagate a composition comprising particles in a flow stream comprising a core stream and a sheath flow stream;

a light source for irradiating the particles of the composition;

a light detection system for detecting light from the irradiated particles, wherein the particles are bonded by a bond having a dissociation constant of $10^{-6}$ M or less to an irradiation power density-sensitive compound that comprises an upconverting nanoparticle (UCNP) and emits light having an intensity that depends on irradiation power density of the light source incident on the particle; and a processor comprising memory operably coupled to the processor wherein the memory comprises instructions stored thereon, which when executed by the processor, the processor is configured to determine a position of the particles in the flow stream based on the detected light emission from the irradiated particles.

* * * * *